(12) United States Patent
Choi et al.

(10) Patent No.: US 11,232,329 B2
(45) Date of Patent: Jan. 25, 2022

(54) METHOD AND APPARATUS FOR PROVIDING USER-CUSTOMIZED FOOD INFORMATION

(71) Applicant: LG ELECTRONICS INC., Seoul (KR)

(72) Inventors: Sunhwa Choi, Seoul (KR); Jinok Kim, Seoul (KR); Sungmok Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/603,207

(22) PCT Filed: May 22, 2019

(86) PCT No.: PCT/KR2019/006123
§ 371 (c)(1),
(2) Date: Oct. 4, 2019

(87) PCT Pub. No.: WO2020/235715
PCT Pub. Date: Nov. 26, 2020

(65) Prior Publication Data
US 2020/0151517 A1    May 14, 2020

(51) Int. Cl.
*G06K 9/62* (2006.01)
*G06K 9/00* (2006.01)
(Continued)

(52) U.S. Cl.
CPC ......... *G06K 9/6267* (2013.01); *G06F 16/535* (2019.01); *G06K 9/00288* (2013.01);
(Continued)

(58) Field of Classification Search
None
See application file for complete search history.

(56) References Cited

U.S. PATENT DOCUMENTS

2020/0088463 A1\* 3/2020 Jeong .................... G06T 19/006

FOREIGN PATENT DOCUMENTS

| KR | 1020060114903 | 11/2006 |
| KR | 101136226 | 4/2012 |

(Continued)

OTHER PUBLICATIONS

PCT International Application No. PCT/KR2019/006123, International Search Report dated Feb. 21, 2020, 3 pages.

*Primary Examiner* — Leon Flores
(74) *Attorney, Agent, or Firm* — Lee, Hong, Degerman, Kang & Waimey PC

(57) ABSTRACT

Disclosed is a method for providing user-customized food information. In the method for providing user-customized food information, when an input of a user is received, the user is classified, history related to the classified user is retrieved from among previously stored food entry/exit history, and information on preferred food of the classified user on the basis of the retrieved entry/exit history, thereby easily providing intuitive information on preferred food having a high usage frequency for each user. The device for providing user-customized food information of the present disclosure is linked to an artificial intelligence module, a robot, an augmented reality (AR) device, a virtual reality (VR) device, a device related to a 5G service, and the like. Can be.

18 Claims, 29 Drawing Sheets

(51) Int. Cl.
*G06F 16/535* (2019.01)
*H04W 4/70* (2018.01)
*H04L 12/28* (2006.01)
*G16Y 20/40* (2020.01)
*G06N 3/02* (2006.01)

(52) U.S. Cl.
CPC ............... *G06N 3/02* (2013.01); *G16Y 20/40* (2020.01); *H04L 12/2823* (2013.01); *H04W 4/70* (2018.02)

(56) References Cited

FOREIGN PATENT DOCUMENTS

| KR | 1020120117464 | 10/2012 |
| KR | 1020180017741 | 2/2018 |
| KR | 1020180126859 | 11/2018 |

* cited by examiner

FIG. 29
(A)
(B)

METHOD AND APPARATUS FOR PROVIDING USER-CUSTOMIZED FOOD INFORMATION

CROSS-REFERENCE TO RELATED APPLICATIONS

This application is the National Stage filing under 35 U.S.C. 371 of International Application No. PCT/KR2019/006123, filed on May 22, 2019, the contents of which are hereby incorporated by reference herein in its entirety.

TECHNICAL FIELD

The present disclosure relates to a method and apparatus for providing user-customized food information, and more particularly, to a method and apparatus for providing food information in a refrigerator for each registered user.

BACKGROUND ART

A refrigerator is a type of storage device used for storing items for a long period of time. The refrigerator maintains a storage space at a set temperature using cold air generated according to a thermodynamic refrigerating cycle, thereby keeping freshness of the stored items as long as possible.

Recently, as the number of one-man households has increased and a sharing economy has been activated, related venture industries such as We Work or the like has also grown rapidly and a home appliance market targeting the sharing economy is expected to be activated. In particular, many users registered in refrigerating devices share the refrigerating devices.

However, in a related art, in providing information related to food to users, customized information is provided for each user.

DISCLOSURE

Technical Problem

An object of the present disclosure is to meet the needs and solve the problems.

Furthermore, the present disclosure proposes a user-customized food information providing method and apparatus for informing each user of a position of frequently used food through face and food recognition and providing an inventory management service.

Technical Solution

According to an aspect of the present disclosure, there is provided a method for providing user-customized food information, including: classifying a user as one of at least one previously registered user if an input of the user is received; retrieving entry/exit history of food related to the classified user from among at least one previously stored food entry/exit history; and providing information on preferred food related to the classified user on the basis of the retrieved entry/exit history of the food.

The method may further include registering the user, wherein the registering of the user may include registering the user on the basis of a number of times a face of the user is classified.

The registering of the user may include: capturing an image of the user to obtain a face image when the input of the user is received; inputting the face image to a previously learned face classification model to classify the face of the user; updating the number of times the face of the user is classified; and registering the classified user if the updated number of times of classification exceeds a predetermined threshold value.

The face classification model may be learned using a predetermined number of images among a plurality of previously stored images of faces.

The at least one previously stored food entry/exit history may be separately generated for each of the at least one registered user.

The method may further include: updating the at least one previously stored food entry/exit history, wherein the updating of the entry/exit history includes: obtaining a difference image between an internal image before the door is closed and an internal image after the door is closed, when the door is closed; inputting the difference image to the previously learned food classification model to classify at least one food which is put in or taken out before the door is closed; and adding information related to entry or exit of the at least one classified food to the at least one previously stored food entry/exit history.

The method may further include: learning the food classification model, wherein the learning of the food classification model includes: selecting a predetermined number of images from among a plurality of previously stored food images; extracting feature information of food included in the selected number of images and internal feature information; and inputting the feature information of the food and the internal feature information to the food classification model to learn the food classification model.

The providing of the information on the preferred food may include outputting an internal position of the preferred food, stock of the preferred food, or entry/exit history of the preferred food.

The providing of the information on the preferred food may include providing intake nutrition information of the classified user on the basis of the entry/exit history of food related to the classified user.

The providing of the information on the preferred food may include: notifying an external device in which an account of the user is registered about that the preferred food is taken out by another user, if a user recognized when the preferred food is taken out is different from the user related to the preferred food.

According to another aspect of the present disclosure, there is provided an apparatus for providing user-customized food information including: an input interface receiving an input of a user; a processor, when the input is received, classifying the user as at least one of at least one previously registered user and retrieving entry/exit history of food related to the classified user from among at least one previously stored food entry/exit history; and an output interface providing information on preferred food related to the classified user on the basis of the retrieved entry/exit history of the food.

The processor may register the user on the basis of a number of times a face of the user is classified.

When the input of the user is received, the processor may capture an image of the user to obtain a face image, input the face image to a previously learned face classification model to classify the face of the user, update the number of times the face of the user is classified, and register the classified user if the updated number of times of classification exceeds a predetermined threshold value.

The face classification model may be learned using a predetermined number of images among a plurality of previously stored images of faces.

The at least one previously stored food entry/exit history may be separately generated for each of the at least one registered user.

When the door is closed, the processor may obtain a difference image between an internal image before the door is closed and an internal image after the door is closed, input the difference image to the previously learned food classification model to classify at least one food which is put in or taken out before the door is closed, and add information related to entry or exit of the at least one classified food to the at least one previously stored food entry/exit history.

The processor may select a predetermined number of images from among a plurality of previously stored food images, extract feature information of food included in the selected number of images and internal feature information, and input the feature information of the food and the internal feature information to the food classification model to learn the food classification model.

The apparatus may further include a communication interface connected to a 5G wireless communication system providing a $5^{th}$ generation (5G) service and connected to external device in which an account of the classified user is registered through the 5G wireless communication system, wherein if a user recognized when the preferred food is taken out is different from the user related to the preferred food, the processor may inform the external device that the preferred food is taken out by another user through the communication interface.

The 5G service may include a massive machine-type communication (mMTC) service, and the processor may inform the external device that the preferred food is taken out by the other user via an MTC physical uplink shared channel (MPUSCH) and/or an MTC physical uplink control channel (MPUCCH) which are physical resources provided through the mMTC service, through the communication interface.

The 5G wireless communication system may include a narrowband-Internet of things (NB-IoT) system providing a system bandwidth related to some resource blocks of the 5G wireless communication system and providing the mMTC service, and the processor may perform an initial access procedure to the 5G wireless communication system via an anchor type carrier related to the NB-IoT system and inform the external device that the preferred food is taken out by the other user via a non-anchor type carrier related to the NB-IoT system, through the communication interface.

Advantageous Effects

The method and apparatus for providing user-customized food information according to an embodiment of the present disclosure may easily provide intuitive information on preferred food having a high use frequency for each user.

Also, the method and apparatus for providing user-customized food information according to an embodiment of the present disclosure may recognize a user and food more quickly and easily using meta learning and may easily provide customized food information for each user.

DESCRIPTION OF DRAWINGS

FIG. 29 shows a process of obtaining a difference image.

MODE FOR INVENTION

Hereinafter, embodiments of the disclosure will be described in detail with reference to the attached drawings. The same or similar components are given the same reference numbers and redundant description thereof is omitted.

The suffixes "module" and "unit" of elements herein are used for convenience of description and thus may be used interchangeably and do not have any distinguishable meanings or functions. Further, in the following description, if a detailed description of known techniques associated with the present disclosure would unnecessarily obscure the gist of the present disclosure, detailed description thereof will be omitted. In addition, the attached drawings are provided for easy understanding of embodiments of the disclosure and do not limit technical spirits of the disclosure, and the embodiments should be construed as including all modifications, equivalents, and alternatives falling within the spirit and scope of the embodiments.

While terms, such as "first", "second", etc., may be used to describe various components, such components must not be limited by the above terms. The above terms are used only to distinguish one component from another.

When an element is "coupled" or "connected" to another element, it should be understood that a third element may be present between the two elements although the element may be directly coupled or connected to the other element. When an element is "directly coupled" or "directly connected" to another element, it should be understood that no element is present between the two elements.

The singular forms are intended to include the plural forms as well, unless the context clearly indicates otherwise.

In addition, in the specification, it will be further understood that the terms "comprise" and "include" specify the presence of stated features, integers, steps, operations, elements, components, and/or combinations thereof, but do not preclude the presence or addition of one or more other features, integers, steps, operations, elements, components, and/or combinations.

A. Example of Autonomous Vehicle and 5G Network

Figure 1:
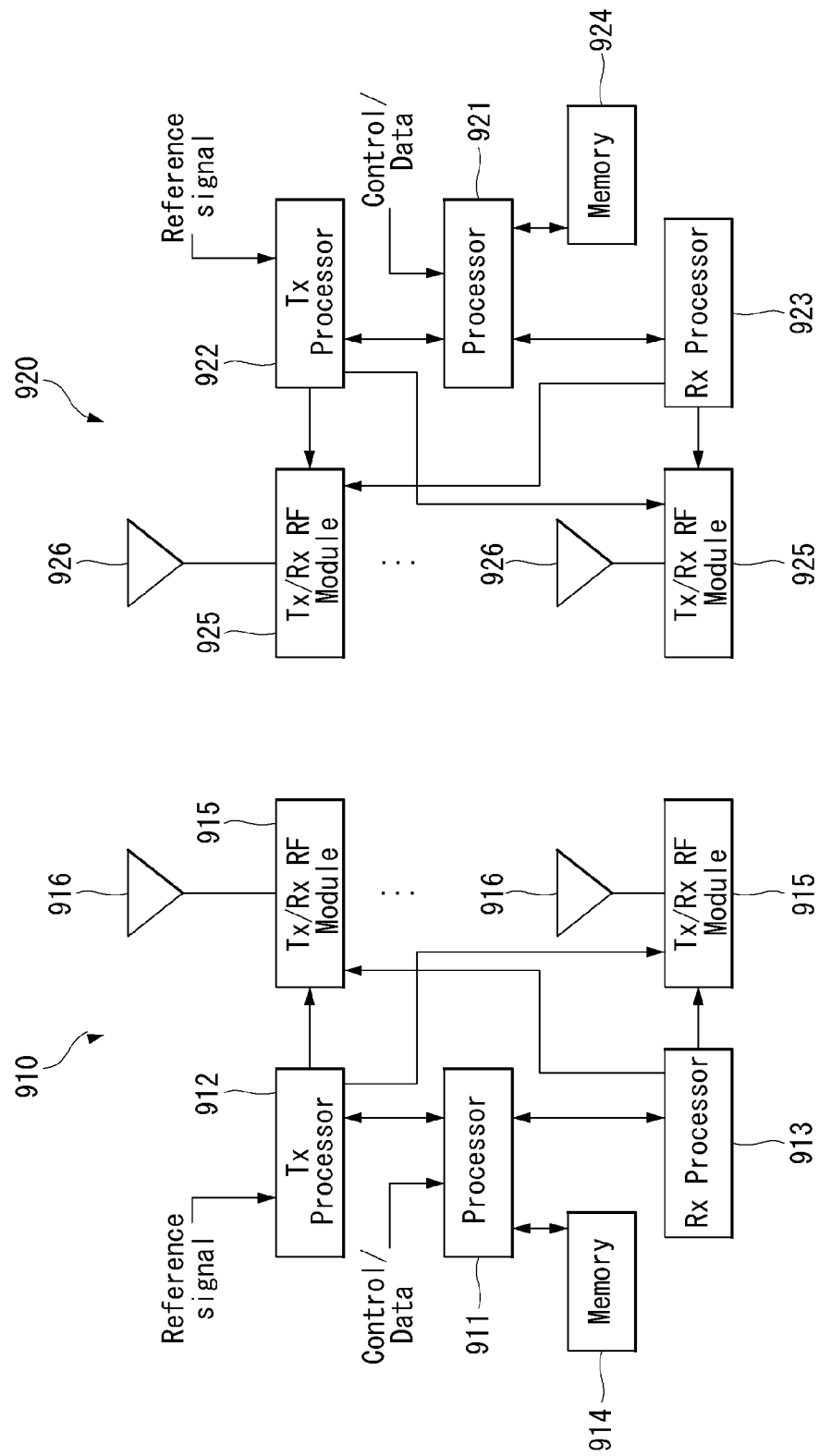
FIG. 1 is a block diagram of a wireless communication system to which the methods proposed herein may be applied.

FIG. 1 is a block diagram of a wireless communication system to which methods proposed in the disclosure are applicable.

Referring to FIG. 1, a device including an autonomous driving module is defined as a first communication device (910 of FIG. 1 and see paragraph N for detailed description), and a processor 911 may perform detailed autonomous driving operations.

Another vehicle or a 5G network communicating with the autonomous driving device is defined as a second communication device (920 of FIG. 1, and see paragraph N for details), and a processor 921 may perform detailed autonomous driving operations.

Details of a wireless communication system, which is defined as including a first communication device, which is an autonomous vehicle, and a second communication device, which is a 5G network, may refer to paragraph N.

B. AI Operation Using 5G Communication

Figure 2:
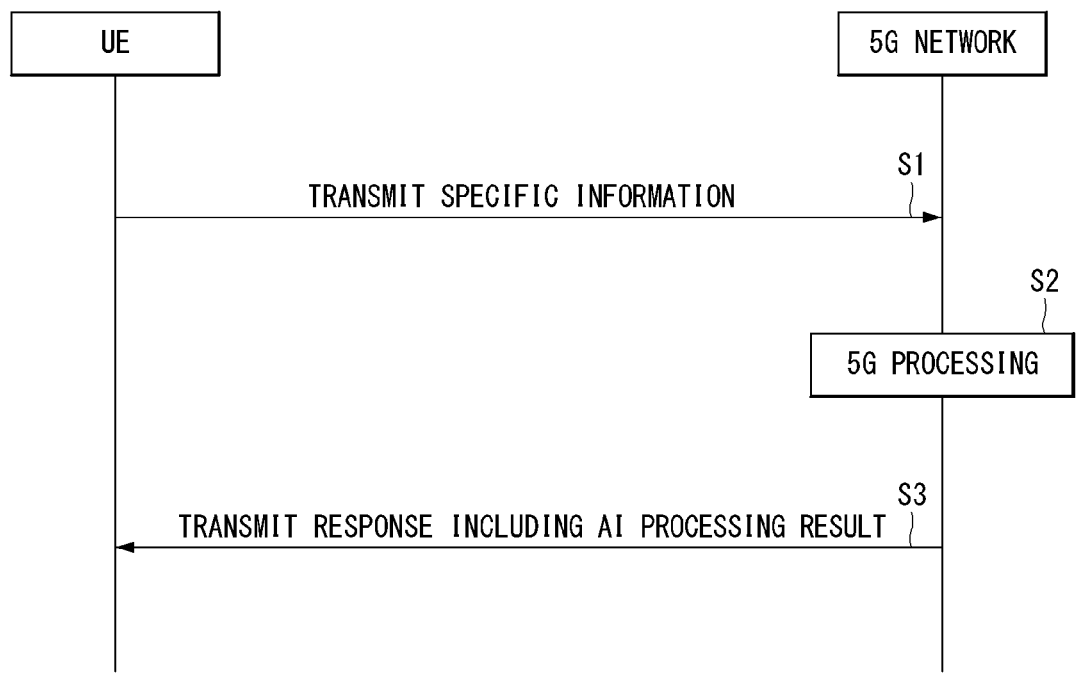
FIG. 2 shows an example of a basic operation of an user equipment and a 5G network in a 5G communication system.

FIG. 2 shows an example of a basic operation of a user equipment and a 5G network in a 5G communication system.

The UE transmits the specific information transmission to the 5G network (S1).

Then, the 5G network performs 5G processing on the specific information (S2).

In this connection, the 5G processing may include AI processing.

Then, the 5G network transmits a response including the AI processing result to the UE (S3).

Figure 3:
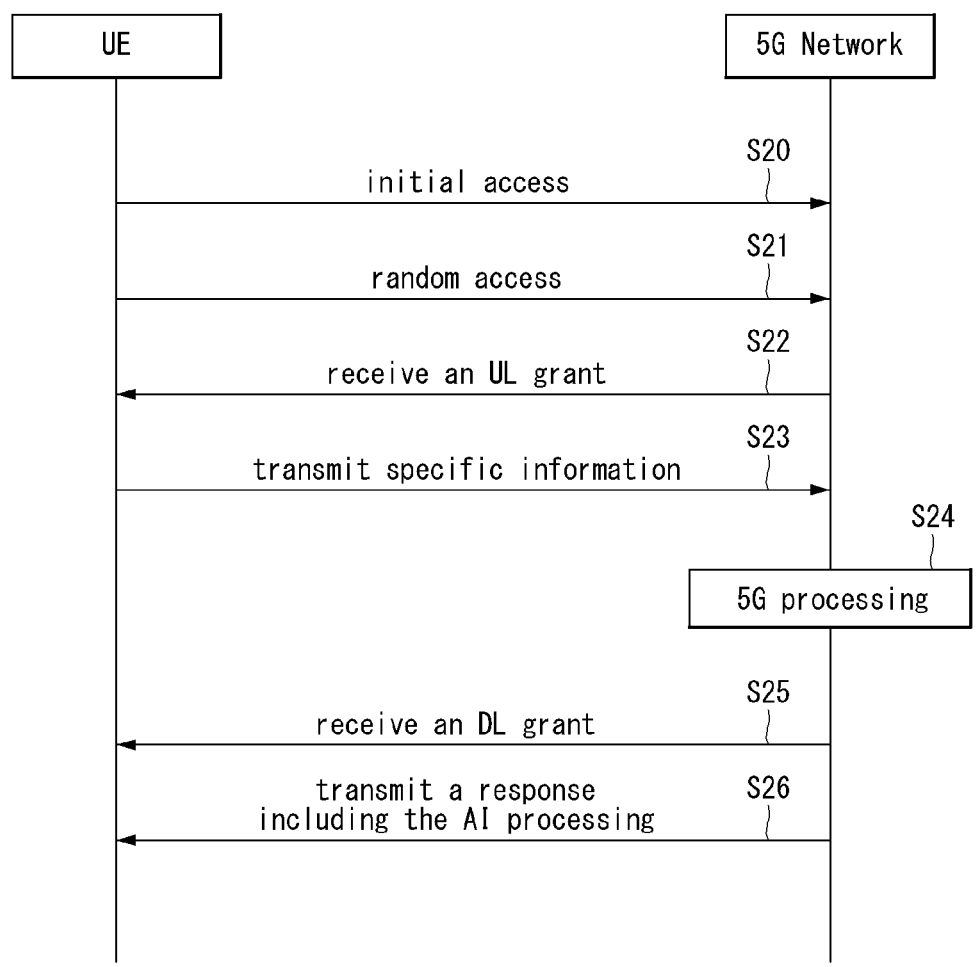
FIG. 3 illustrates an example of application operation of an user equipment and a 5G network in a 5G communication system.

FIG. 3 shows an example of application operation of a user terminal and a 5G network in a 5G communication system.

The UE performs an initial access procedure with the 5G network (S20). The initial connection procedure will be described in more detail in paragraph F.

Then, the UE performs a random access procedure with the 5G network (S21). The random access procedure will be described in more detail in paragraph G.

The 5G network transmits an UL grant for scheduling transmission of specific information to the UE (S22). The process of the UE receiving the UL grant will be described in more detail in the UL transmission/reception operation in paragraph H.

Then, the UE transmits specific information to the 5G network based on the UL grant (S23).

Then, the 5G network performs 5G processing on the specific information (S24).

In this connection, the 5G processing may include AI processing.

Then, the 5G network transmits a DL grant for scheduling transmission of the 5G processing result of the specific information to the UE (S25).

Then, the 5G network transmits a response including the AI processing result to the UE based on the DL grant (S26).

In FIG. 3, an example in which the AI operation and the initial connection process, or the random access process and the DL grant reception process are combined with each other has been exemplarily described using the S20 to S26. However, the present disclosure is not limited thereto.

For example, the initial connection process and/or the random access process may be performed using the process of S20, S22, S23, S24, and S24. In addition, the initial connection process and/or the random access process may be performed using, for example, the process of S21, S22, S23, S24, and S26. Further, the AI operation and the downlink grant reception procedure may be combined with each other using the process of S23, S24, S25, and S26.

C. UE Operation Using 5G Communication

FIG. 4 to FIG. 7 show an example of the operation of the UE using 5G communication.

Figure 4:
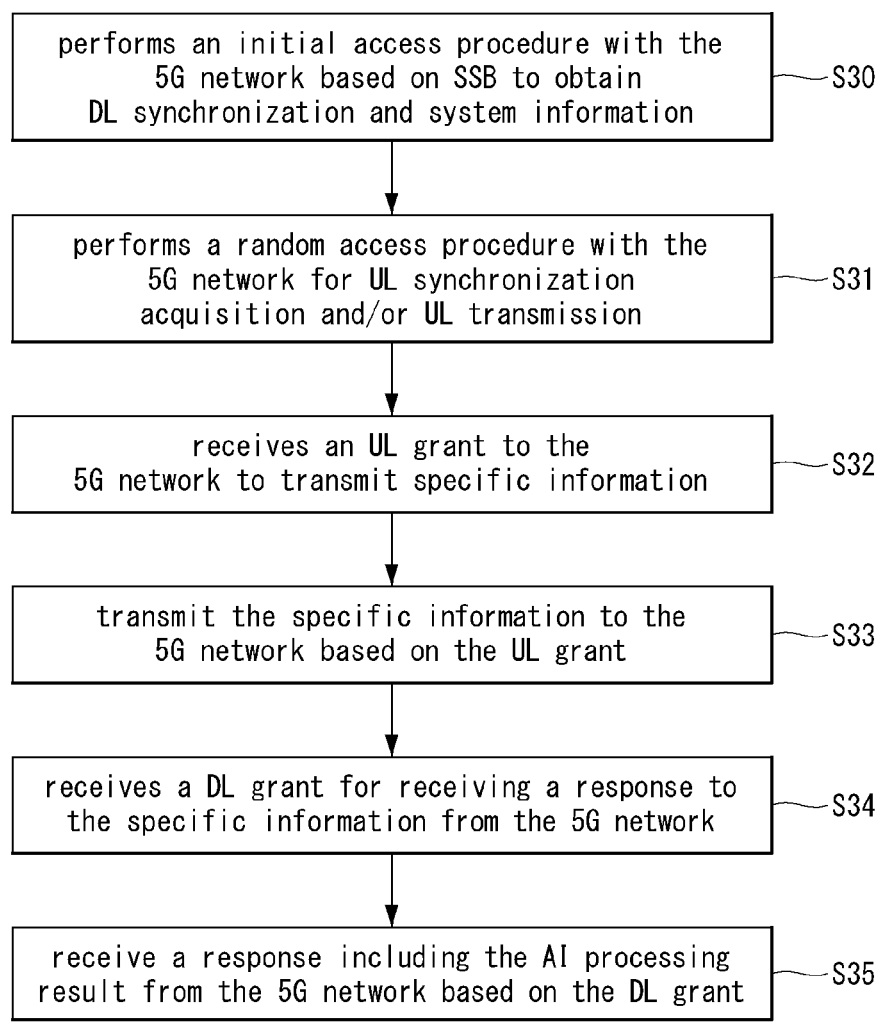
FIGS. 4 to 7 show an example of an operation of an user equipment using 5G communication.

Referring first to FIG. 4, the UE performs an initial access procedure with the 5G network based on SSB to obtain DL synchronization and system information (S30).

Then, the UE performs a random access procedure with the 5G network for UL synchronization acquisition and/or UL transmission (S31).

Then, the UE receives an UL grant to the 5G network to transmit specific information (S32).

Then, the UE transmits the specific information to the 5G network based on the UL grant (S33).

Then, the UE receives a DL grant for receiving a response to the specific information from the 5G network (S34).

Then, the UE receives a response including the AI processing result from the 5G network based on the DL grant (S35).

A beam management (BM) process may be added to S30. A beam failure recovery process may be added to S31. A quasi-co location relationship may be added to S32 to S35. A more detailed description thereof will be described in more detail in paragraph I.

Figure 5:
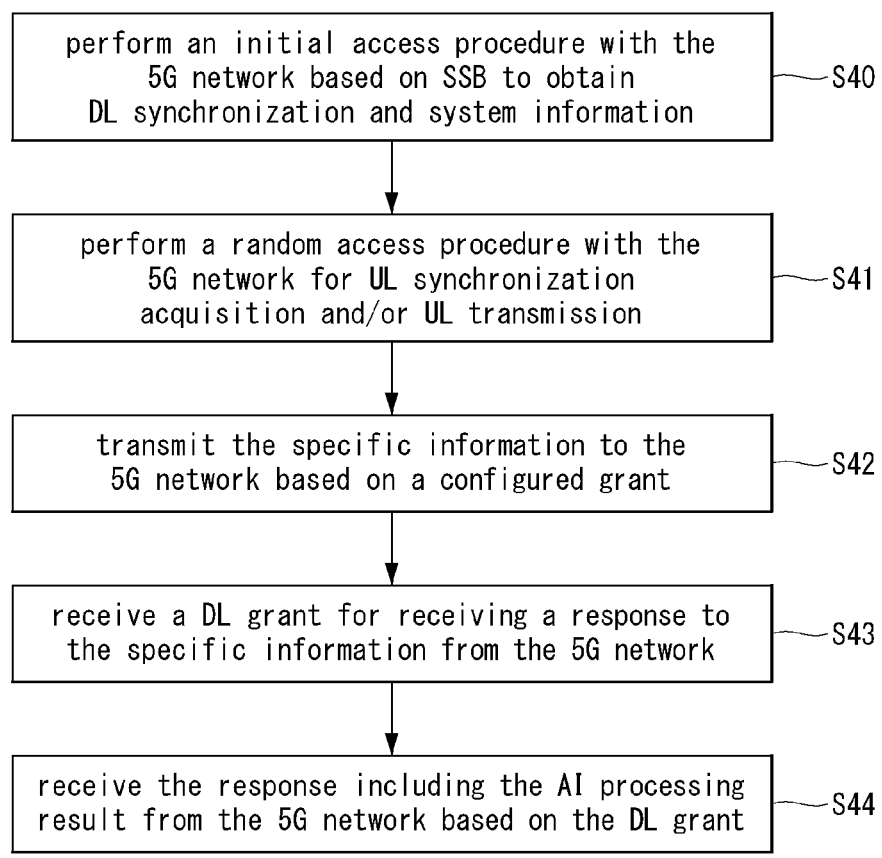

Next, referring to FIG. 5, the UE performs an initial access procedure with the 5G network based on SSB to obtain DL synchronization and system information (S40).

Then, the UE performs a random access procedure with the 5G network for UL synchronization acquisition and/or UL transmission (S41).

Then, the UE transmits the specific information to the 5G network based on a configured grant (S42). A procedure for configuring the grant in place of receiving the UL grant from the 5G network will be described in more detail in paragraph H.

Then, the UE receives a DL grant for receiving a response to the specific information from the 5G network (S43).

Then, the UE receives the response including the AI processing result from the 5G network based on the DL grant (S44).

Figure 6:
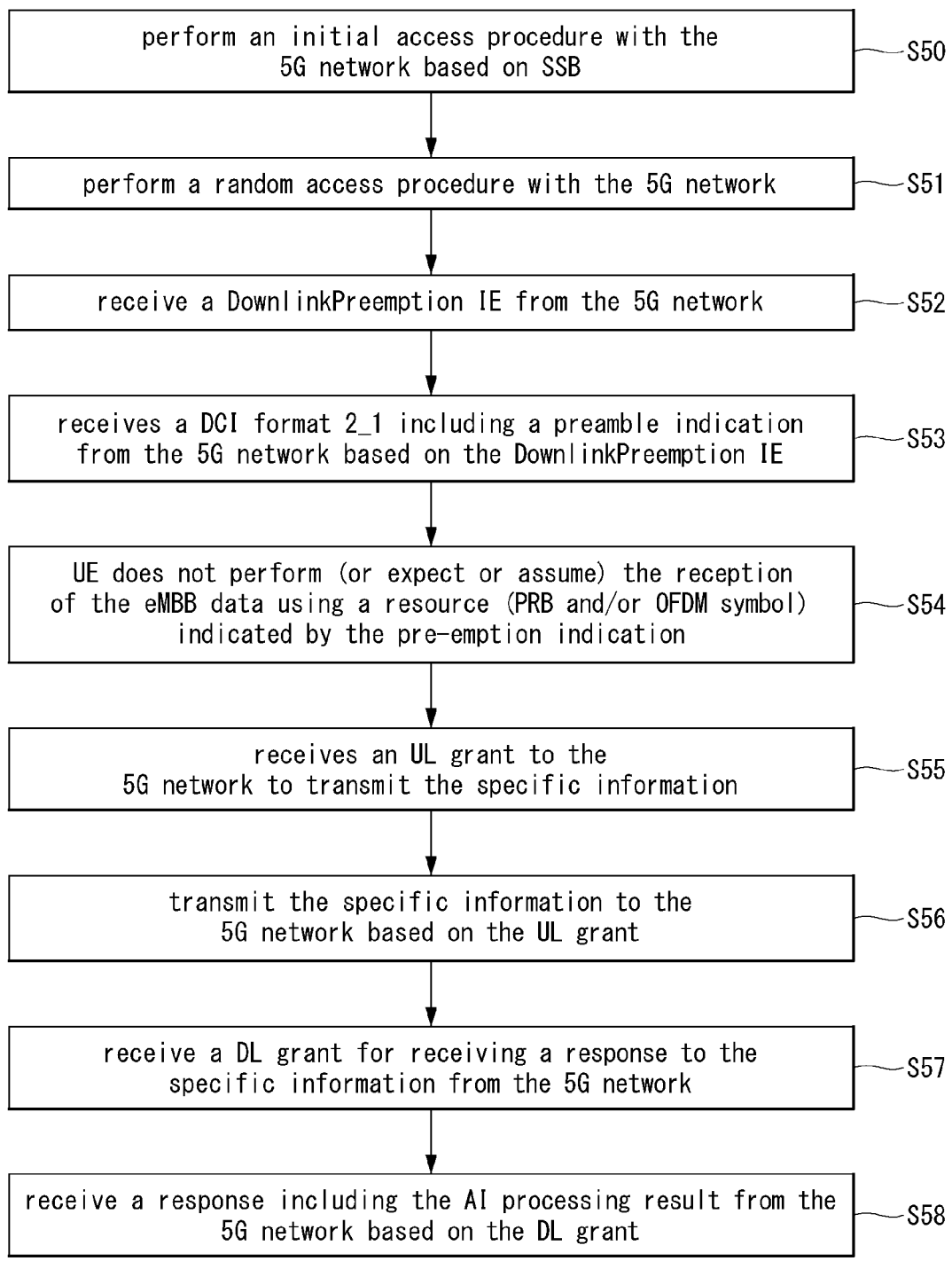

Next, referring to FIG. 6, the UE performs an initial access procedure with the 5G network based on the SSB to obtain DL synchronization and system information (S50).

Then, the UE performs a random access procedure with the 5G network for UL synchronization acquisition and/or UL transmission (S51).

Then, the UE receives a DownlinkPreemption IE from the 5G network (S52).

The UE receives a DCI format 2_1 including a preamble indication from the 5G network based on the DownlinkPreemption IE (S53).

Then, the UE does not perform (or expect or assume) the reception of the eMBB data using a resource (PRB and/or OFDM symbol) indicated by the pre-emption indication (S54).

The operation related to the preemption indication is described in more detail in paragraph J.

Then, the UE receives an UL grant to the 5G network to transmit the specific information (S55).

Then, the UE transmits the specific information to the 5G network based on the UL grant (S56).

Then, the UE receives a DL grant for receiving a response to the specific information from the 5G network (S57).

Then, the UE receives a response including the AI processing result from the 5G network based on the DL grant (S58).

Figure 7:
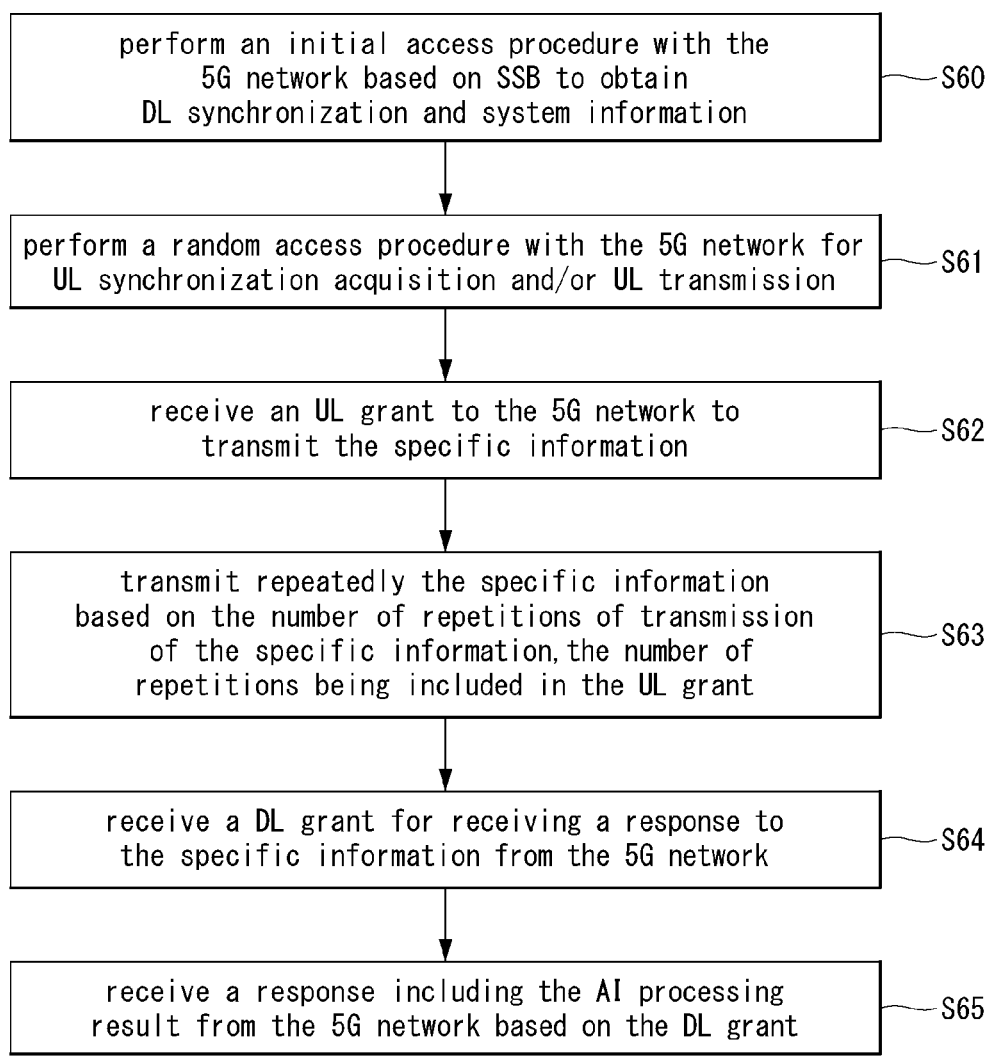

Next, referring to FIG. 7, the UE performs an initial access procedure with the 5G network based on SSB to obtain DL synchronization and system information (S60).

Then, the UE performs a random access procedure with the 5G network for UL synchronization acquisition and/or UL transmission (S61).

Then, the UE receives an UL grant to the 5G network to transmit the specific information (S62).

The UL grant includes information on the number of repetitions of transmission of the specific information. The specific information is repeatedly transmitted based on the information on the repetition number (S63).

The UE transmits the specific information to the 5G network based on the UL grant.

Then, the iterative transmission of the specific information is performed using the frequency hopping. The first transmission of the specific information may be done using a first frequency resource, and the second transmission of the specific information may be done using a second frequency resource.

The specific information may be transmitted over a narrow band of 6RB (Resource Block) or 1RB (Resource Block).

Then, the UE receives a DL grant for receiving a response to the specific information from the 5G network (S64).

Then, the UE receives a response including the AI processing result from the 5G network based on the DL grant (S65).

The mMTC described in FIG. 7 will be described in more detail in the paragraph K.

D. Introduction

Hereinafter, downlink (DL) refers to communication from a base station (BS) to user equipment (UE), and uplink (UL) refers to communication from a UE to a BS. In the downlink, a transmitter may be part of the BS and a receiver may be part of the UE. In the uplink, a transmitter may be part of the UE and a receiver may be part of the BS. Herein, the UE may be represented as a first communication device and the BS may be represented as a second communication device. The BS may be replaced with a term such as a fixed station, a Node B, an evolved NodeB (eNB), a next generation nodeB (gNB), a base transceiver system (BTS), an access point (AP), a network or a 5G (5th generation), artificial intelligence (AI) system, a road side unit (RSU), robot, and the like. Also, the UE may be replaced with a terminal, a mobile station (MS), a user terminal (UT), a mobile subscriber station (MSS), a subscriber station (SS), an advanced mobile station (AMS), a wireless terminal (WT), a machine-type communication (MTC) device, a machine-to-machine (M2M) device, a device-to-device (D2D) device, a vehicle, a robot, an AI module, and the like.

Techniques described herein may be used in a variety of wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc.

For clarity, the following description focuses on a 3GPP communication system (e.g., LTE-A, NR), but technical features of the present disclosure is not limited thereto. LTE refers to technology after 3GPP TS 36.xxx Release 8.

E. MMTC (Massive MTC)

Massive Machine Type Communication (mMTC) is one of the 5G scenarios for supporting hyperconnected services that communicate with a large number of UEs simultaneously. In this environment, the UE communicates intermittently with very low transmission speed and mobility. Therefore, mMTC aims to be able to run the UE for a long time at low cost. In this regard, we will look at the MTC and NB-IoT covered by the 3GPP.

Hereinafter, a case in which a transmission time interval of a physical channel is a subframe will be described as an example. For example, the minimum time interval from the start of transmission of one physical channel (eg, MPDCCH, PDSCH, PUCCH, PUSCH) to the start of transmission of the next physical channel is described as an example of one subframe, but in the following description The subframe may be replaced with a slot, mini-slot, or multiple slots.

MTC (Machine Type Communication)

Machine Type Communication (MTC) is an application that does not require much throughput that can be applied to machine-to-machine (M2M) or Internet-of-Things (IoT). A communication technology adopted to meet the requirements of MTC can be implemented to meet the criteria of (1) low cost & low complexity, (2) enhanced coverage, and (3) low power consumption.

The contents described below are mainly related to features related to eMTC, but may also be applied to MTC to be applied to MTC, eMTC, 5G (or NR) unless otherwise specified. Hereinafter, for convenience of description, the description will be collectively referred to as MTC.

Therefore, MTC described later includes eMTC (enhanced MTC), LTE-M1/M2, BL (Bandwidth reduced low complexity)/CE (coverage enhanced), non-BL UE (in enhanced coverage), NR MTC, enhanced BL/CE, etc. May be referred to as other terms. That is, the term MTC may be replaced with a term to be defined in a future 3GPP standard.

MTC Signal Transmission/Reception Method

The MTC UE, which is powered on again or enters a new cell, performs an initial cell search operation such as synchronizing with the BS. To this end, the MTC UE receives a primary synchronization signal (PSS) and a secondary synchronization signal (SSS) from the BS, adjusts synchronization with the BS, and acquires information such as a cell ID. The PSS/SSS used in the initial cell search operation of the MTC may be a PSS/SSS, a resynchronization signal (RSS), or the like of an legacy LTE.

Thereafter, the MTC UE may receive a physical broadcast channel (PBCH) signal from the BS to acquire broadcast information in a cell.

Meanwhile, the MTC UE may receive a downlink reference signal (DL RS) in an initial cell search step to check a downlink channel state. The broadcast information transmitted through the PBCH is a master information block (MIB), and in the LTE, the MIB is repeated by every 10 ms.

Among the bits of the MIB of the legacy LTE, reserved bits are used in MTC to transmit scheduling for a new SIB1-BR (system information block for bandwidth reduced device) including a time/frequency location and a transport block size. The SIB-BR is transmitted directly on the PDSCH without any control channel (e.g., PDCCH, MPDDCH) associated with the SIB-BR.

Upon completion of the initial cell search, the MTC UE may receive an MPDCCH and a PDSCH according to the MPDCCH information to acquire more specific system information. The MPDCCH may be transmitted only once or repeatedly. The maximum number of repetitions of the MPDCCH is set to the UE by RRC signaling from the BS.

Thereafter, the MTC UE may perform a random access procedure to complete the connection to the BS. A basic configuration related to the RACH process of the MTC UE is transmitted by SIB2. In addition, SIB2 includes parameters related to paging. In the 3GPP system, a paging occasion (PO) refers to a time unit in which the UE may attempt to receive paging. The MTC UE attempts to receive the MPDCCH on the basis of a P-RNTI in the time unit corresponding to its PO on the narrowband (PNB) set for paging. The UE that has successfully decoded the MPDCCH on the basis of the P-RNTI may receive a PDSCH scheduled by the MPDCCH and check a paging message for itself. If there is a paging message for itself, the UE performs a random access procedure to access a network.

For the random access procedure, the MTC UE transmits a preamble through a physical random access channel (PRACH), and receives a response message (RAR) for the preamble through the MPDCCH and the corresponding PDSCH. In the case of a contention-based random access, the MTC UE may perform a contention resolution procedure such as transmission of an additional PRACH signal and reception of the MPDCCH signal and corresponding PDSCH signal. The signals and/or messages Msg 1, Msg 2, Msg 3, and Msg 4 transmitted in the RACH process in the MTC may be repeatedly transmitted, and the repeat pattern is set to be different according to the CE level. Msg1 denotes a PRACH preamble, Msg2 denotes a random access response (RAR), Msg3 denotes UL transmission on the basis of a UL grant included in the RAR, and Msg4 denotes a DL transmission of the BS to Msg3.

For random access, PRACH resources for the different CE levels are signaled by the BS. This provides the same control of a near-far effect on the PRACH by grouping together UEs experiencing similar path loss. Up to four different PRACH resources may be signaled to the MTC UE.

The MTC UE estimates RSRP using a downlink RS (e.g., CRS, CSI-RS, TRS, and the like), and selects one of different PRACH resources (e.g., frequency, time, and preamble resources for PRACH) for the random access on the basis of the measurement result. The RAR for the PRACH and search spaces for the contention resolution messages for PRACH are also signaled at the BS via system information.

The MTC UE that has performed the above-described process may then receive an MPDCCH signal and/or a PDSCH signal and transmit a physical uplink shared channel (PUSCH) signal and/or a physical uplink control channel (PUCCH) as a general uplink/downlink signal transmission process. The MTC UE may transmit uplink control information (UCI) to the BS through the PUCCH or PUSCH. The UCI may include HARQ-ACK/NACK, scheduling request (SR), and/or CSI.

When RRC connection to the MTC UE is established, the MTC UE monitors the MPDCCH in a search space set to acquire uplink and downlink data allocation and attempts to receive the MDCCH.

In the case of MTC, the MPDCCH and the PDSCH scheduled by the MDCCH are transmitted/received in different subframes. For example, the MPDCCH having the last repetition in subframe #n schedules the PDSCH starting at subframe #n+2. The DCI transmitted by the MPDCCH provides information on how many times the MPDCCH is repeated so that the MTC UE may know when the PDSCH transmission is started. For example, when the DCI in the MPDCCH started to be transmitted from the subframe #n includes information that the MPDCCH is repeated 10 times, a last subframe in which the MPDCCH is transmitted is the subframe #n+9 and transmission of the PDSCH may start at subframe #n+11.

The PDSCH may be scheduled in the same as or different from a narrow band in which the MPDCCH scheduling the PDSCH is present. If the MPDCCH and the corresponding PDSCH are located in different narrow bands, the MTC UE needs to retune the frequency to the narrow band in which the PDSCH is present before decoding the PDSCH.

For uplink data transmission, scheduling may follow the same timing as legacy LTE. For example, the MPDCCH which is lastly transmitted at subframe #n may schedule PUSCH transmission starting at subframe #n+4.

In the legacy LTE, the PDSCH is scheduled using the PDCCH, which uses the first OFDM symbol(s) in each subframe, and the PDSCH is scheduled in the same subframe as the subframe in which the PDCCH is received.

In contrast, the MTC PDSCH is cross-subframe scheduled, and one subframe between the MPDCCH and the PDSCH is used as a time period for MPDCCH decoding and RF retuning. The MTC control channel and data channel may be repeated over a large number of subframes including up to 256 subframes for the MPDCCH and up to 2048 subframes for the PDSCH so that they may be decoded under extreme coverage conditions.

NB-IoT (Narrowband-Internet of Things)

The NB-IoT may refer to a system for supporting low complexity, low power consumption through a system bandwidth (system BW) corresponding to one resource block (RB) of a wireless communication system.

Here, NB-IoT may be referred to as other terms such as NB-LTE, NB-IoT enhancement, enhanced NB-IoT, further enhanced NB-IoT, NB-NR. That is, NB-IoT may be replaced with a term defined or to be defined in the 3GPP standard, and hereinafter, it will be collectively referred to as 'NB-IoT' for convenience of explanation.

The NB-IoT is a system for supporting a device (or UE) such as machine-type communication (MTC) in a cellular system so as to be used as a communication method for implementing IoT (i.e., Internet of Things). Here, one RB of the existing system band is allocated for the NB-IoT, so that the frequency may be efficiently used. Also, in the case of NB-IoT, each UE recognizes a single RB as a respective carrier, so that RB and carrier referred to in connection with NB-IoT in the present specification may be interpreted to have the same meaning.

Hereinafter, a frame structure, a physical channel, a multi-carrier operation, an operation mode, and general signal transmission/reception related to the NB-IoT in the present specification are described in consideration of the case of the legacy LTE system, but may also be extendedly applied to a next generation system (e.g., an NR system, etc.). In addition, the contents related to NB-IoT in this specification may be extendedly applied to MTC (Machine Type Communication) oriented for similar technical purposes (e.g., low-power, low-cost, coverage enhancement, etc.).

Hereinafter, a case where a transmission time interval of a physical channel is a subframe are described as an example. For example, a case where a minimum time interval from the start of transmission of one physical channel (e.g., NPDCCH, NPDSCH, NPUCCH, NPUSCH) to the start of transmission of a next physical channel is one subframe will be described, but in the following description, the subframe may be replaced by a slot, a mini-slot, or multiple slots.

Frame Structure and Physical Resource of NB-IoT

First, the NB-IoT frame structure may be configured to be different according to subcarrier spacing.

In addition, although the NB-IoT frame structure on the basis of the LTE system frame structure has been exemplified in the present specification, it is merely for the convenience of explanation and the present disclosure is not limited thereto. The method described in this disclosure may also be extendedly applied to NB-IoT based on a frame structure of a next-generation system (e.g., NR system).

Next, physical resources of the NB-IoT for each of downlink and uplink will be described.

First, the physical resources of the NB-IoT downlink may be configured by referring to physical resources of other wireless communication system (e.g., LTE system, NR system, etc.), except that a system bandwidth is limited to a certain number of RBs (e.g., one RB, i.e., 180 kHz).

Next, in the case of the NB-IoT uplink physical resource, the system bandwidth may be limited to one RB as in the case of downlink.

In NB-IoT, resource units (RUs) are used for mapping the PUSCH for NB-IoT (hereinafter referred to as NPUSCH) to resource elements. RU may include NULsymb*NULslot SC-FDMA symbols in the time domain and include NRUsc number of consecutive subcarriers in the frequency domain.

Physical Channel of NB-IoT

A BS and/or a UE supporting the NB-IoT may be configured to transmit/receive physical channels and/or physical signals configured separately from the legacy system. Hereinafter, specific contents related to physical channels and/or physical signals supported by the NB-IoT will be described.

An orthogonal frequency division multiple access (OFDMA) scheme may be applied to the NB-IoT downlink on the basis of a subscriber spacing of 15 kHz. Through this, co-existence with other systems (e.g., LTE system, NR system) may be efficiently supported by providing orthogonality between subcarriers. A downlink physical channel/signal of the NB-IoT system may be represented by adding 'N (Narrowband)' to distinguish it from the legacy system. For example, a downlink physical channel may be referred to as an NPBCH (narrowband physical broadcast channel), an NPDCCH (narrowband physical downlink control channel), or an NPDSCH (narrowband physical downlink shared channel), and a downlink physical signal may be referred to as an NPSS (narrowband primary synchronization signal), an NSSS (narrowband secondary synchronization signal), an NRS (narrowband reference signal), an NPRS (narrowband positioning reference signal), an NWUS (narrowband wake up signal), and the like. Generally, the downlink physical channels and physical signals of the NB-IoT may be configured to be transmitted on the basis of a time domain multiplexing scheme and/or a frequency domain multiplexing scheme. In the case of NPBCH, NPDCCH, NPDSCH, etc., which are the downlink channels of the NB-IoT system, repetition transmission may be performed for coverage enhancement. In addition, the NB-IoT uses a newly defined DCI format. For example, the DCI format for NB-IoT may be defined as DCI format N0, DCI format N1, DCI format N2, and the like.

In the NB-IoT uplink, a single carrier frequency division multiple access (SC-FDMA) scheme may be applied on the basis of a subscriber spacing of 15 kHz or 3.75 kHz. As mentioned in the downlink section, the physical channel of the NB-IoT system may be expressed by adding 'N (Narrowband)' to distinguish it from the existing system. For example, the uplink physical channel may be represented by a narrowband physical random access channel (NPRACH) or a narrowband physical uplink shared channel (NPUSCH), and the uplink physical signal may be represented by a narrowband demodulation reference signal (NDMRS), or the like. NPUSCH may be divided into NPUSCH format 1 and NPUSCH format 2. In one example, NPUSCH Format 1 may be used for uplink shared channel (UL-SCH) transmission (or transport), and NPUSCH Format 2 may be used for uplink control information transmission such as HARQ ACK signaling. In the case of NPRACH, which is an uplink channel of the NB-IoT system, repetition transmission may be performed for coverage enhancement. In this case, repetition transmission may be performed by applying frequency hopping.

Multi-Carrier Operation of NB-IoT

Next, a multi-carrier operation of the NB-IoT will be described. The multicarrier operation may refer to that multiple carriers set for different uses (i.e., different types) are used for transmitting/receiving channels and/or signals between the BS and/or UE in the NB-Iot.

The NB-IoT may operate in a multi-carrier mode. Here, in the NB-IoT, a carrier wave in the N-Iot may be classified as an anchor type carrier (i.e., an anchor carrier, an anchor PRB) and a non-anchor type carrier a non-anchor type carrier (i.e., non-anchor carrier).

The anchor carrier may refer to a carrier that transmits NPSS, NSSS, NPBCH, and NPDSCH for a system information block (N-SIB) for initial access from a point of view of the BS. That is, in NB-IoT, the carrier for initial access may be referred to as an anchor carrier and the other(s) may be referred to as a non-anchor carrier. Here, only one anchor carrier wave may exist in the system, or there may be a plurality of anchor carrier waves.

Operation Mode of NB-IoT

Next, an operation mode of the NB-IoT will be described. In the NB-IoT system, three operation modes may be supported. FIG. 32 shows an example of operation modes supported in the NB-IoT system. Although the operation mode of the NB-IoT is described herein on the basis of an LTE band, this is for convenience of explanation and may be extendedly applied to other system bands (e.g. NR system band).

Specifically, FIG. 32(*a*) shows an example of an in-band system, FIG. 32(*b*) shows an example of a guard-band system, and FIG. 32(*c*) Represents an example of a stand-alone system. In this case, the in-band system may be expressed as an in-band mode, the guard-band system may be expressed as a guard-band mode, and the stand-alone system may be expressed in a stand-alone mode.

The in-band system may refer to a system or mode that uses a specific RB in the (legacy) LTE band. The in-band system may be operated by allocating some resource blocks of the LTE system carrier.

A guard-band system may refer to a system or mode that uses NB-IoT in a space reserved for a guard-band of the legacy LTE band. The guard-band system may be operated by allocating a guard-band of an LTE carrier not used as a resource block in the LTE system. For example, the (legacy) LTE band may be configured to have a guard-band of at least 100 kHz at the end of each LTE band, and with two non-contiguous guard-bands for 200 kHz for NB-IoT may be used.

As described above, the in-band system and the guard-band system may be operated in a structure in which NB-IoT coexists in the (legacy) LTE band.

By contrast, the stand-alone system may refer to a system or mode that is configured independently of the legacy LTE band. The stand-alone system may be operated by separately allocating frequency bands (e.g., reassigned GSM carriers in the future) used in a GERAN (GSM EDGE radio access network).

The three operation modes described above may be operated independently of each other, or two or more operation modes may be operated in combination.

NB-IoT Signal Transmission/Reception Process

FIG. 33 is a diagram illustrating an example of physical channels that may be used for NB-IoT and a general signal transmission method using the same. In a wireless communication system, an NB-IoT UE may receive information from a BS through a downlink (DL) and the NB-IoT UE may transmit information to the BS through an uplink (UL). In other words, in the wireless communication system, the BS may transmit information to the NB-IoT UE through the downlink and the BS may receive information from the NB-IoT UE through the uplink.

The information transmitted/received by the BS and the NB-IoT UE includes data and various control information, and various physical channels may exist depending on the type/purpose of the information transmitted/received by the BS and NB-IoT UE. The signal transmission/reception method of the NB-IoT may be performed by the above-described wireless communication devices (e.g., BS and UE).

The NB-IoT UE, which is powered on again or enters a new cell, may perform an initial cell search operation such as adjusting synchronization with the BS, or the like (S11). To this end, the NB-IoT UE receives NPSS and NSSS from the BS, performs synchronization with the BS, and acquires cell identity information. Also, the NB-IoT UE may receive the NPBCH from the BS and acquire the in-cell broadcast information. In addition, the NB-IoT UE may receive a DL RS (downlink reference signal) in the initial cell search step to check a downlink channel state.

After completion of the initial cell search, the NB-IoT UE may receive the NPDCCH and the corresponding NPDSCH to acquire more specific system information (S12). In other words, the BS may transmit more specific system information by transmitting the NPDCCH and corresponding NPDSCH to the NB-IoT UE after completion of the initial cell search.

Thereafter, the NB-IoT UE may perform a random access procedure to complete connection to the BS (S13 to S16).

Specifically, the NB-IoT UE may transmit a preamble to the BS via the NPRACH (S13). As described above, the NPRACH may be configured to be repeatedly transmitted on the basis of frequency hopping or the like to enhance coverage or the like. In other words, the BS may (repeatedly) receive a preamble through the NPRACH from the NB-IoT UE.

Thereafter, the NB-IoT UE may receive a random access response (RAR) for the preamble from the BS through the NPDCCH and the corresponding NPDSCH (S14). In other words, the BS may transmit the RAR for the preamble to the NB-IoT UE through the NPDCCH and the corresponding NPDSCH.

Thereafter, the NB-IoT UE transmits the NPUSCH to the BS using scheduling information in the RAR (S15), and may perform a contention resolution procedure such as the NPDCCH and the corresponding NPDSCH (S16). In other words, the BS may receive the NPUSCH from the UE using the scheduling information in the NB-IoT RAR, and perform the contention resolution procedure.

The NB-IoT UE that has performed the above-described process may perform NPDCCH/NPDSCH reception (S17) and NPUSCH transmission (S18) as a general uplink/downlink signal transmission process. In other words, after performing the above-described processes, the BS may perform NPDCCH/NPDSCH transmission and NPUSCH reception as a general signal transmission/reception process to the NB-IoT UE.

In the case of NB-IoT, as mentioned above, NPBCH, NPDCCH, NPDSCH, and the like may be repeatedly transmitted for coverage improvement and the like. In the case of NB-IoT, UL-SCH (i.e., general uplink data) and uplink control information may be transmitted through the NPUSCH. Here, the UL-SCH and the uplink control information (UCI) may be configured to be transmitted through different NPUSCH formats (e.g., NPUSCH format 1, NPUSCH format 2, etc.).

Also, the UCI may include HARQ ACK/NACK (Hybrid Automatic Repeat and reQuest Acknowledgement/Negative-ACK), SR (Scheduling Request), CSI (Channel State Information), and the like. As described above, the UCI in the NB-IoT may generally be transmitted via the NPUSCH. Also, in response to a request/instruction from the network (e.g., BS), the UE may transmit the UCI via the NPUSCH in a periodic, aperiodic, or semi-persistent manner.

Hereinafter, the wireless communication system block diagram shown in FIG. 1 will be described in detail.

F. Wireless Communication Device

Referring to FIG. 1, a wireless communication system includes a first communication device 910 and/or a second communication device 920. 'A and/or B' may be interpreted to have the same meaning as 'includes at least one of A or B.' The first communication device may represent a BS and the second communication device may represent a UE (alternatively, the first communication device may represent a UE and the second communication device may represent a BS).

The first and second communication devices may include processors 911 and 921, memories 914 and 924, one or more Tx/Rx RF modules 915 and 925, Tx processors 912 and 922, Rx processors 913 and 923, and antennas 916 and 926, respectively. The Tx/Rx module is also called a transceiver. The processor implements the functions, procedures and/or methods discussed above. More specifically, in the DL (communication from the first communication device to the second communication device), a higher layer packet from the core network is provided to the processor 911. The processor implements the function of a layer 2 (i.e., L2) layer. In the DL, the processor multiplexes a logical channel and a transport channel, provides radio resource allocation to the second communication device 920, and is responsible for signaling to the second communication device. A transmission (TX) processor 912 implements various signal processing functions for the L1 layer (i.e., the physical layer). The signal processing function facilitates forward error correction (FEC) in the second communication device, and includes coding and interleaving. The encoded and interleaved signals are scrambled and modulated into complex-valued modulation symbols. For modulation, BPSK (Quadrature Phase Shift Keying), QPSK (Quadrature Phase Shift Keying), 16QAM (quadrature amplitude modulation), 64QAM, 246QAM, and the like may be used. The complex-valued modulation symbols (hereinafter referred to as modulation symbols) are divided into parallel streams, each stream being mapped to an OFDM subcarrier and multiplexed with a reference signal (RS) in the time and/or frequency domain, and combined together using IFFT (Inverse Fast Fourier Transform) to create a physical channel carrying a time domain OFDM symbol stream. The OFDM symbol stream is spatially precoded to produce multiple spatial streams. Each spatial stream may be provided to a different antenna 916 via a separate Tx/Rx module (or transceiver, 915). Each Tx/Rx module may upconvert each spatial stream into an RF carrier for transmission. In the second communication device, each Tx/Rx module (or transceiver, 925) receives a signal of the RF carrier via each antenna 926 of each Tx/Rx module. Each Tx/Rx module restores the RF carrier signal to a baseband signal and provides it to the reception (RX) processor 923. The RX processor implements various signal processing functions of the L1 (i.e., the physical layer). The RX processor may perform spatial processing on the information to recover any spatial stream directed to the second communication device. If multiple spatial streams are directed to the second communication device, they may be combined into a single OFDMA symbol stream by multiple RX processors. The RX processor transforms the OFDM symbol stream, which is a time domain signal, into a frequency domain signal using a fast Fourier transform (FFT). The frequency domain signal includes a separate OFDM symbol stream for each subcarrier of the OFDM signal. The modulation symbols and the reference signal on each subcarrier are recovered and demodulated by determining the most likely signal constellation points sent by the first communication device. These soft decisions may be based on channel estimate values. Soft decisions are decoded and deinterleaved to recover data and control signals originally transmitted by the first communication device on the physical channel. The corresponding data and control signals are provided to the processor 921.

The UL (communication from the second communication device to the first communication device) is processed in the first communication device 910 in a manner similar to that described in connection with a receiver function in the second communication device 920. Each Tx/Rx module 925 receives a signal via each antenna 926. Each Tx/Rx module provides an RF carrier and information to RX processor 923. The processor 921 may be related to the memory 924 that stores program code and data. The memory may be referred to as a computer-readable medium.

The above-described 5G communication technology can be combined with methods proposed in the present disclosure which will be described later and applied or can complement the methods proposed in the present disclosure to make technical features of the methods concrete and clear.

DESCRIPTION OF PRESENT DISCLOSURE

Hereinafter, a method and apparatus for providing user-customized food information according to an embodiment of the present disclosure will be described in detail with reference to FIGS. 8 to 29.

Figure 8:
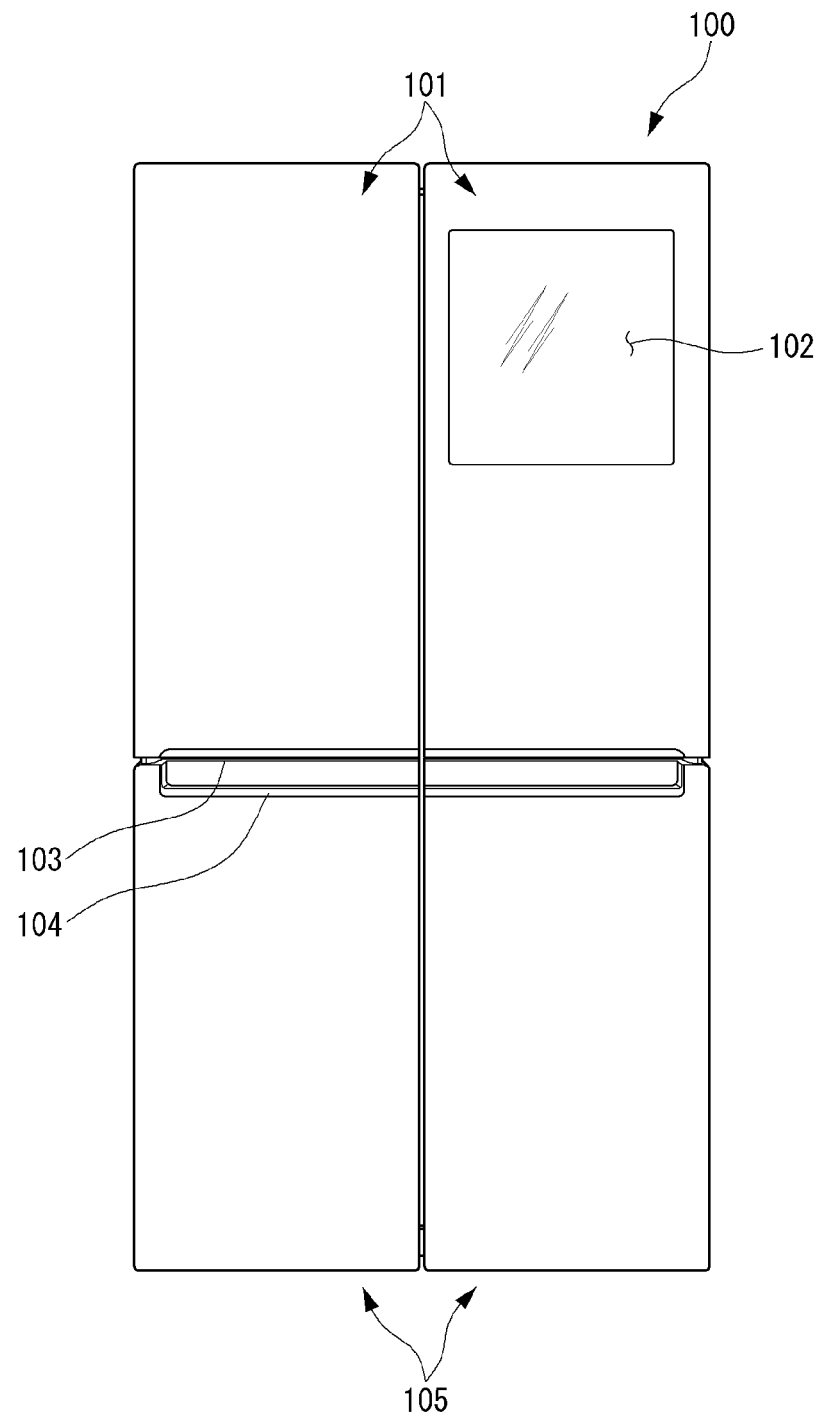
FIG. 8 is a front view of a refrigerating device according to an embodiment of the present disclosure.
Figure 9:
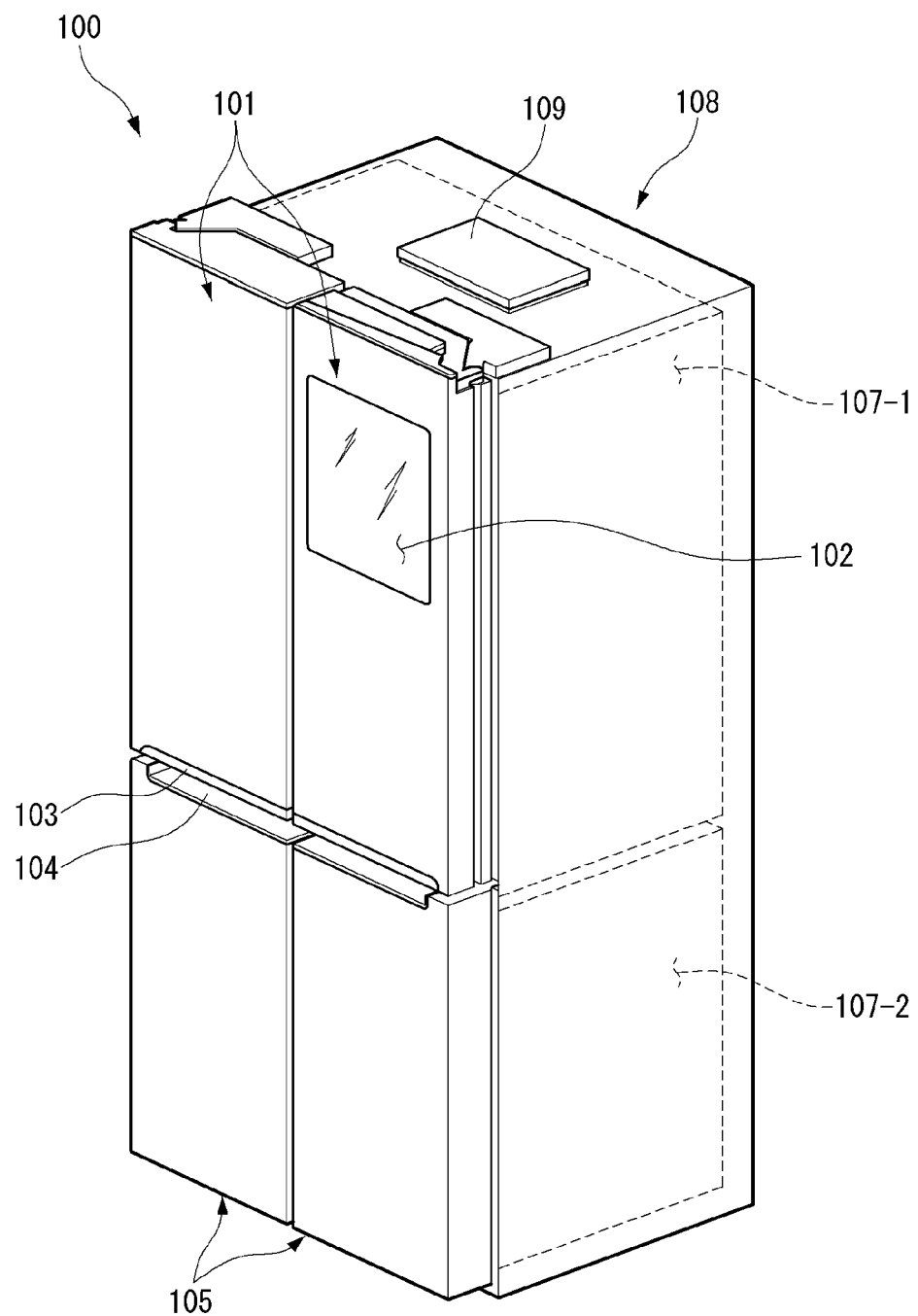
FIG. 9 is a perspective view of a refrigerating device according to an embodiment of the present disclosure.

FIG. 8 is a front view of a refrigerating device according to an embodiment of the present disclosure. FIG. 9 is a perspective view of a refrigerating device according to an embodiment of the present disclosure.

Referring to FIGS. 8 and 9, an artificial intelligent refrigerating device 100 according to an embodiment of the present disclosure may include a main body 108 forming a storage space and doors 101 and 105 for opening and closing the storage space.

A control board 109 for controlling an overall operation of the refrigerating device 100 may be disposed on one side of the main body 108. The control board 109 may include a controller to control an overall operation related to authentication registration and use as well as a cooling operation. The control board 109 may include an authentication unit and a memory for authentication registration and use.

The storage space may be a storage chamber including a refrigerating chamber 107-1 and a freezing chamber 107-2. Positions of the refrigerating chamber 107-1 and the freezing chamber 107-2 are not limited to those shown and may be variously modified. The refrigerating chamber 107-1 and/or the freezing chamber 107-2 may include a plurality of storage compartments independent of each other.

The storage compartments may include a plurality of private storage compartments and at least one shared storage compartment to meet the concept of sharing economy. The private storage compartments may be set to be locked for use by only one authenticated registered user. The shared storage compartment may be set to be locked for use by only some authenticated registered users or may not set to be locked for use by all authenticated registered users.

The doors 101 and 105 may include a refrigerating chamber door 101 for opening and closing the refrigerating chamber 107-1 and a freezing chamber door 105 for opening and closing the freezing chamber 107-2. The refrigerating chamber door 101 may be provided as a pair of doors for opening and closing two refrigerating chambers 107-1 divided laterally, but the present disclosure is not limited thereto. The freezing chamber door 105 may be provided as a pair of doors for opening and closing two freezing chambers 107-2 divided laterally, but the present disclosure is not limited thereto. In other words, the position and the number of the refrigerating chamber doors 101 and the freezing chamber doors 105 may be modified to any extent depending on a configuration of the storage space.

Depressed handle recesses 103 and 104 may be provided at a lower end of the refrigerating chamber door 101 and at an upper end of the freezing chamber door 105 but the present disclosure is not limited thereto. The user may put his or her hand into the handle recesses 103 and 104 to open and close the refrigerating chamber door 101 or the freezing chamber door 105.

A display unit 102 may be provided on one outer side of the refrigerating chamber door 101 or the freezing chamber door 105. Although the display unit 102 is shown to be provided on one side of the refrigerator door 101, a technical idea of the present disclosure is not limited thereto. The display unit 102 may display occupation status of the storage compartments, whether the storage compartments are set to be locked, and the like distinguished by a display color or an indicator. The display unit 102 may visually differentiate between the display states (color or indictor) of the storage compartments according to the occupation status and whether the storage compartments are set to be locked, thereby intuitively informing the user of an available storage compartment through authentication.

The display unit 102 may be provided with various authentication means for user authentication.

Figure 10:
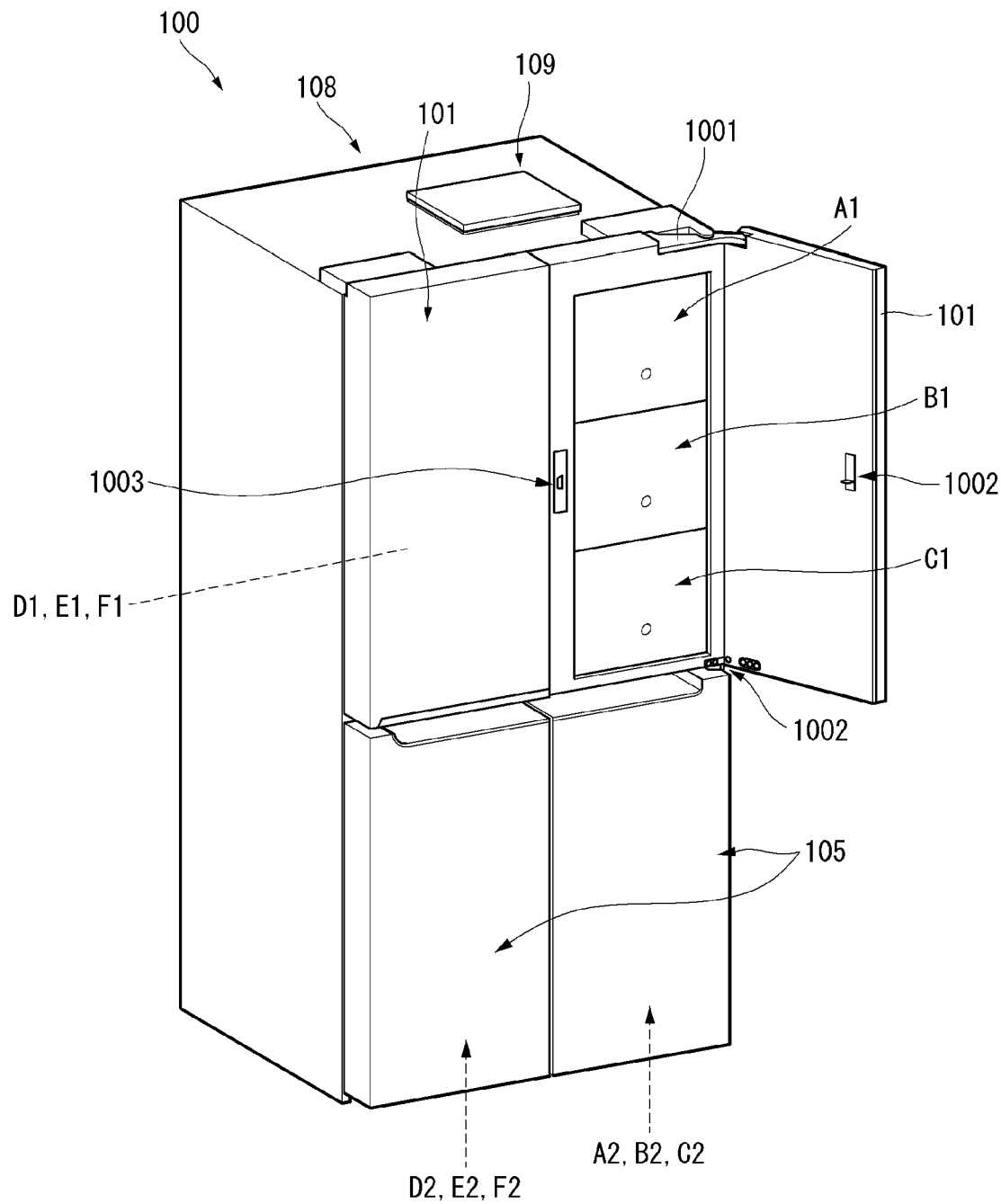
FIG. 10 is a perspective view showing storage compartments provided in a storage chamber of a user-customized food information providing apparatus (refrigerating device) according to an embodiment of the present disclosure.
Figure 11:
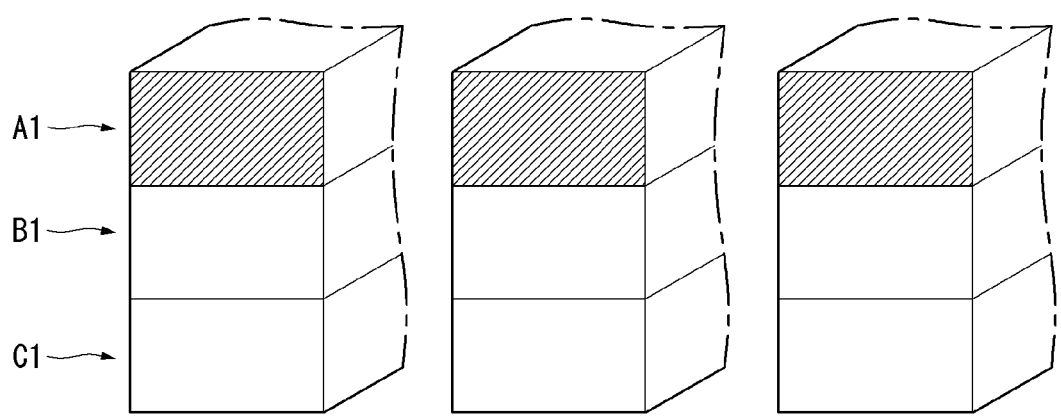
FIG. 11 shows an example of a personal storage compartment matched to each user in a user-customized food information providing apparatus (refrigerating device).

FIG. 10 is a perspective view showing storage compartments provided in a storage chamber of a user-customized food information providing apparatus (refrigerating device) according to an embodiment of the present disclosure. FIG. 11 shows an example of a personal storage compartment matched to each user in a user-customized food information providing apparatus (refrigerating device).

Referring to FIG. 10, the refrigerating chamber 107-1 may include a first storage chamber and a second storage chamber, and the freezing chamber 107-2 may include a third storage chamber and a fourth storage chamber.

The first storage chamber may include a plurality of first storage compartments A1, B1, and C1 independent of each other, and the second storage chamber may include a plurality of second storage compartments D1, E1, and F1. The first storage compartments A1, B1, and C1 and the second storage compartments D1, E1, and F1 may each be shielded by an inner door which may be set to be locked. The inner doors may be implemented in a variety of known ways, such as pulling, lifting, folding, sliding, and the like.

The first storage compartments A1, B1, and C1 may be implemented as a locked private storage compartment and a shared storage compartment, and may further include a shared storage compartment which is not locked. Similarly, the second storage compartments D1, E1, and F1 may be implemented as a locked private storage compartment and a shared storage compartment and may further include a shared storage compartment which is not locked.

The third storage chamber may include a plurality of third storage compartments A2, B2, and C2 independent of each other, and the fourth storage chamber may include a plurality of fourth storage compartments D2, E2, and F2 independent of each other. The third storage compartments A2, B2, and C2 and the fourth storage compartments D2, E2, and F2 may be shielded by inner doors that may be locked. The inner doors may be implemented in various known ways, such as pulling, lifting, folding, sliding, and the like.

The third storage compartments A2, B2, and C2 may be implemented as a locked private storage compartment and a shared storage compartment and may further include a shared storage compartment that is not locked. Similarly, the fourth storage compartments D2, E2, and F2 may be implemented as a locked private storage compartment and a shared storage compartment and may further include a shared storage compartment that is not locked.

Meanwhile, the refrigerating chamber door 101 includes a first door (right door) for opening and closing the first storage chamber and a second door (left door) for opening and closing the second storage chamber. The first door may be kept closed as first locking units 42 and 55 are coupled, and may be kept open as the first locking unit 42 and 55 are separated. An upper hinge 1001 and a lower hinge 502 are rotatably mounted on an upper end and a lower end of the first door, respectively, so that the first door may be smoothly opened and closed. The second door has a configuration similar to the first door.

The freezing chamber door 105 includes a third door (right door) for opening and closing the third storage chamber and a fourth door (left door) for opening and closing the fourth storage chamber. The third door and the fourth door have a configuration similar to the first door.

Figure 12:
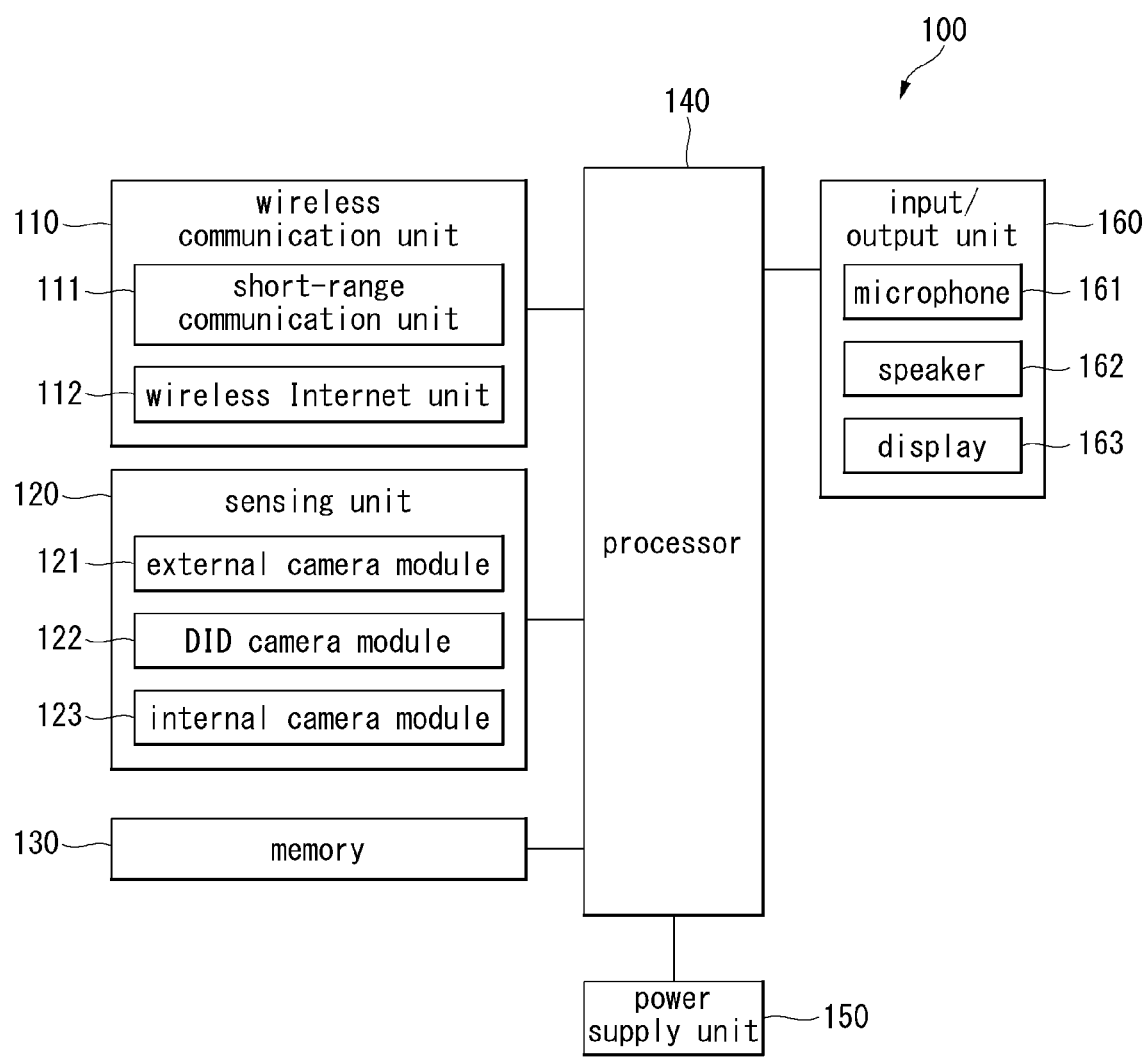
FIG. 12 illustrates a user-customized food information providing apparatus according to an embodiment of the present disclosure.

FIG. 12 illustrates a user-customized food information providing apparatus according to an embodiment of the present disclosure.

As illustrated in FIG. 12, the user-customized food information providing apparatus 100 includes a wireless communication unit 110, a sensing unit 120, a memory 130, a processor 140, a power supply unit 150, and/or an input/output unit 160.

Specifically, the wireless communication unit 110 among the components may include one or more modules enabling wireless communication between the user-customized food information providing apparatus 100 and a wireless communication system, between the user-customized food information providing apparatus 100 and other user-customized food information providing apparatus 100, or between the user-customized food information providing apparatus 100 and an external server. In addition, the wireless communication unit 110 may include one or more modules for connecting the user-customized food information providing apparatus 100 to one or more networks. Here, the wireless communication unit 110 may access a 5G communication system. The wireless communication unit 110 may perform wireless communication with another user-customized food information providing apparatus, external server, or external device (e.g., mobile terminal) through the 5G communication system.

The wireless communication unit 110 may include at least one of a short-range communication unit 111 and a wireless Internet unit 112.

The wireless internet unit 111 refers to a module for wireless internet access and may be embedded or external to the user-customized food information providing apparatus 100. The wireless internet unit 111 is configured to transmit and receive wireless signals in a communication network according to wireless internet technologies.

Examples of wireless Internet technologies include Wireless LAN (WLAN), Wireless-Fidelity (Wi-Fi), Wireless Fidelity (Wi-Fi) Direct, Digital Living Network Alliance (DLNA), Wireless Broadband (WiBro), and WiMAX (World). Interoperability for Microwave Access (HSDPA), High Speed Downlink Packet Access (HSDPA), High Speed Uplink Packet Access (HSUPA), Long Term Evolution (LTE), Long Term Evolution-Advanced (LTE-A), and the like. 111) transmits and receives data according to at least one wireless Internet technology in a range including the Internet technologies not listed above.

In view of the fact that the wireless Internet access by WiBro, HSDPA, HSUPA, GSM, CDMA, WCDMA, LTE, LTE-A, etc. is made through a mobile communication network, the wireless Internet performing wireless internet access through the mobile communication network The unit 111 may be understood as a kind of the mobile communication module.

The short range communication unit 112 is for short range communication, and includes Bluetooth™, Radio Frequency Identification (RFID), Infrared Data Association (IrDA), Ultra Wideband (UWB), ZigBee, NFC (Near field communication may be supported using at least one of Near Field Communication, Wi-Fi, Wi-Fi Direct, and Wireless Universal Serial Bus (USB) technologies. The local area communication unit 112 provides a user-specific food information providing apparatus 100 and other user-customized food information between the user-customized food information providing apparatus 100 and the wireless communication system through a local area network. Wireless communication may be supported between the devices 100 or between a network where a user-customized food information providing device 100 and another mobile terminal (or an external server) are located. The short range wireless communication network may be short range wireless personal area networks.

Here, the other user-customized food information providing apparatus may be a device capable of exchanging data (or interworking) with the user-customized food information providing apparatus 100 according to the present disclosure. The short range communication unit 112 may detect (or recognize) another user-customized food information providing apparatus that can communicate with the user-customized food information providing apparatus 100 around the user-customized food information providing apparatus 100. Further, the processor 140 may provide user-customized food information when the detected other user-customized food information providing device is a user-customized food information providing device certified to communicate with the user-customized food information providing device 100 according to the present disclosure. At least a part of data processed by the apparatus 100 may be transmitted to the other user-customized food information providing apparatus through the short range communication unit 112. Accordingly, the user of the other customized food information providing apparatus may use the data processed by the customized food information providing apparatus 100 through the other customized food information providing apparatus. For example, according to this, the user may receive food information from the user-customized food information providing apparatus 100 and output the food information through a display of another user-customized food information providing apparatus.

The sensing unit 120 may include an external camera module 121, a door-in-door (DID) camera module 122, and/or an internal camera module 123. The external camera module 121 may capture an image of a front surface of the user-customized food information providing apparatus 100 under the control of the processor 140. The DID camera module 122 may capture images of the inside of the storage compartments A1, B1, C1, D1, E1, and F1 inside the user-customized food information providing apparatus 100. The internal camera module 122 may capture images of the inside of the doors 101 and 105 of the user-customized food information providing apparatus 100.

The external camera module 121, the DID camera module 122, and the internal camera module 123 process an image frame such as a still image or a moving image obtained by an image sensor in a video communication mode or an image capture mode. The processed image frame may be displayed on the display 163 or stored in the memory 130. Meanwhile, the plurality of cameras 121 to 123 provided in the user-customized food information providing apparatus 100 may be arranged to have a matrix structure, and through the cameras 121-123 having the matrix structure, and a plurality of pieces of image information having various angles or focal points may be input to the user-customized food information providing apparatus 100. Further, the plurality of cameras 121 to 123 may be arranged in a stereo structure to obtain a left image and a right image for realizing a stereoscopic image.

The memory 130 stores data supporting various functions of the user-customized food information providing apparatus 100. The memory 130 may store a plurality of application programs or applications that are driven by the user customized food information providing apparatus 100, data for operating the user customized food information providing apparatus 100, and instructions. Can be. At least some of these applications may be downloaded from an external server via wireless communication. In addition, at least some of these applications may exist on the user-customized food information providing apparatus 100 from the time of shipment for basic functions (eg, data receiving and transmitting functions) of the user-customized food information providing apparatus 100. have. On the other hand, the application program is stored in the memory 130, is installed on the user-customized food information providing apparatus 100, the processor 140 performs the operation (or function) of the user-customized food information providing apparatus 100. Can be driven to perform.

The power supply unit 150 receives power from an external power source and an internal power source under the control of the processor 140 to supply power to each component included in the user-customized food information providing apparatus 100. The power supply unit 150 includes a battery, which may be a built-in battery or a replaceable battery.

The input/output unit 160 may include a microphone 161 that receives an audio signal from the outside based on the control of the processor 140.

The input/output unit 160 may include a speaker 162 that outputs an audio signal based on the control of the processor 140. For example, the speaker 162 may provide user-customized food information in the form of an audio signal.

The input/output unit 160 may include a display 163 that outputs visual information based on the control of the processor 140. The display unit 161 forms a layer structure with or is integrally formed with the touch sensor, thereby implementing a touch screen. The touch screen may function as a user input unit that provides an input interface between the user-customized food information providing apparatus 100 and the user, and may provide an output interface between the user-customized food information providing apparatus 100 and the user. have. For example, the display unit 161 may obtain information for user registration from the user. In addition, the display unit 161 may output user customized food information in the form of visual information. That is, the display unit 161 may be an input interface of the user-customized service providing apparatus 100 and at the same time, may be an output interface.

According to an embodiment of the present disclosure, the processor 140 may control the wireless communication unit 110, the sensing unit 120, the memory 130, the power supply unit 150, and the input/output unit 160.

According to an embodiment of the present disclosure, the processor 140 may control the wireless communication unit 110 to transmit user-customized food information to an external mobile terminal.

According to an embodiment of the present disclosure, the processor 140 may control the sensing unit 120 to capture an image of the front surface of the user-customized food information providing apparatus 100 and recognize/classify the user on the basis of a front image. The processor 140 may control the sensing unit 120 to capture a front image or an internal image of the user-customized food information providing apparatus 100 to recognize/classify food and recognize entry and exit of food.

According to an embodiment of the present disclosure, the processor 140 may obtain a plurality of face images of a plurality of users stored in the memory 130 and generate/learn a face classification model for classifying faces of the users using (meta learning) only a predetermined number of images among the face images of the plurality of users. In addition, the processor 140 may obtain images of a plurality of food items stored in the memory 130 and may generate/learn a food classification model for classifying the food items using only a predetermined number of images among the images of the plurality of food items.

According to an embodiment of the present disclosure, the processor 140 may control the input/output unit 160 to provide recognized user-customized food information.

Functions/operations of the processor 140 will be described in detail later.

Figure 13:
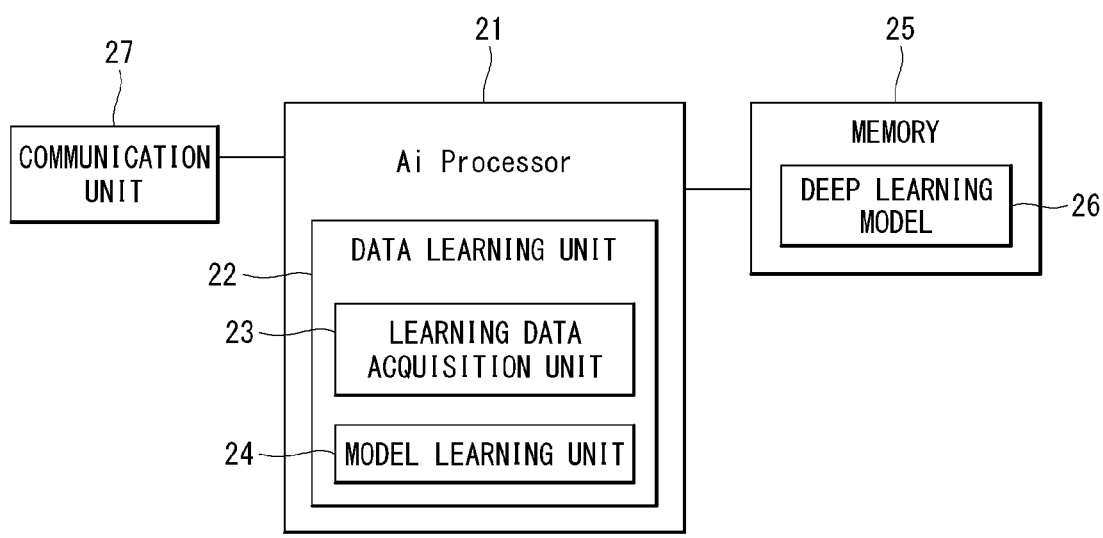
FIG. 13 is a black diagram illustrating an example of the processor of FIG. 12.

FIG. 13 is a black diagram illustrating an example of the processor of FIG. 12.

As shown in FIG. 13, the processor 140 of FIG. 13 may be an AI device 20, but is not necessarily limited thereto.

The AI device 20 may include an electronic device including an AI module capable of performing AI processing or a server including the AI module. In addition, the AI device 20 may be included in at least a part of the user-customized food information providing device 100 shown in FIG. 12 and may be provided to perform at least some of the AI processing together.

The AI processing may include all operations related to the control of the user-customized food information providing apparatus 100 illustrated in FIG. 12. For example, the user-customized food information providing apparatus 100 may perform processing/determination and control signal generation by AI processing the sensing data or the acquired data. In addition, for example, the user-customized food information providing apparatus 100 may AI process the data received through the communication unit to perform control of the intelligent electronic device.

The AI device 20 may be a client device that directly uses the AI processing result, or may be a device of a cloud environment that provides the AI processing result to another device.

The AI device 20 may include an AI processor 21, a memory 25, and/or a communication unit 27.

The AI device 20 is a computing device capable of learning neural networks, and may be implemented as various electronic devices such as a server, a desktop PC, a notebook PC, a tablet PC, and the like.

The AI processor 21 may learn a neural network using a program stored in the memory 25. In particular, the AI processor 21 may learn a neural network for recognizing vehicle-related data. Here, a neural network for recognizing vehicle-related data may be designed to simulate a human brain structure on a computer, and may include a plurality of weighted network nodes that simulate neurons of a human neural network. The plurality of network modes may transmit and receive data according to a connection relationship so that neurons simulate the synaptic activity of neurons that send and receive signals through synapses. Here, the neural network may include a deep learning model developed from the neural network model. In the deep learning model, a plurality of network nodes may be located at different layers and exchange data according to a convolutional connection relationship. Examples of neural network models include deep neural networks (DNNs), convolutional deep neural networks (CNNs), recurrent boltzmann machines (RNNs), restricted boltzmann machines (RBMs), and deep confidence It includes various deep learning techniques such as DBN (deep belief networks) and deep Q-network, and can be applied to fields such as computer vision, speech recognition, natural language processing, and voice/signal processing.

Meanwhile, the processor performing the function as described above may be a general purpose processor (for example, a CPU), but may be an AI dedicated processor (for example, a GPU) for artificial intelligence learning.

The memory 25 may store various programs and data necessary for the operation of the AI device 20. The memory 25 may be implemented as a nonvolatile memory, a volatile memory, a flash memory, a hard disk drive (HDD), or a solid state drive (SDD). The memory 25 is accessed by the AI processor 21, and reading/writing/modifying/deleting/update of data by the AI processor 21 may be performed. In addition, the memory 25 may store a neural network model (eg, the deep learning model 26) generated through a learning algorithm for classifying/recognizing data according to an embodiment of the present disclosure.

Meanwhile, the AI processor 21 may include a data learner 22 for learning a neural network for data classification/recognition. The data learning unit 22 may learn what learning data to use to determine data classification/recognition and how to classify and recognize the data using the learning data. The data learner 22 may learn the deep learning model by acquiring the learning data to be used for learning and applying the acquired learning data to the deep learning model.

The data learner 22 may be manufactured in the form of at least one hardware chip and mounted on the AI device 20. For example, the data learning unit 22 may be manufactured in the form of a dedicated hardware chip for artificial intelligence (AI), or may be manufactured as a part of a general purpose processor (CPU) or a graphics dedicated processor (GPU) to the AI device 20. It may be mounted. In addition, the data learning unit 22 may be implemented as a software module. When implemented as a software module (or program module including instructions), the software module may be stored in a computer readable non-transitory computer readable media. In this case, the at least one software module may be provided by an operating system (OS) or by an application.

The data learner 22 may include a training data acquirer 23 and a model learner 24.

The training data acquisition unit 23 may acquire training data necessary for a neural network model for classifying and recognizing data. For example, the training data acquisition unit 23 may acquire vehicle data and/or sample data for input to the neural network model as the training data.

The model learner 24 may learn to use the acquired training data to have a criterion about how the neural network model classifies predetermined data. In this case, the model learner 24 may train the neural network model through supervised learning using at least some of the training data as a criterion. Alternatively, the model learner 24 may train the neural network model through unsupervised learning that discovers a criterion by learning by using the training data without guidance. In addition, the model learner 24 may train the neural network model through reinforcement learning using feedback on whether the result of the situation determination according to the learning is correct. In addition, the model learner 24 may train the neural network model using a learning algorithm including an error back-propagation method or a gradient decent method.

When the neural network model is trained, the model learner 24 may store the trained neural network model in a memory. The model learner 24 may store the learned neural network model in a memory of a server connected to the AI device 20 through a wired or wireless network.

The data learning unit 22 further includes a training data preprocessor (not shown) and a training data selection unit (not shown) to improve analysis results of the recognition model or to save resources or time required for generating the recognition model. You may.

The training data preprocessor may preprocess the acquired data so that the acquired data may be used for learning for situation determination. For example, the training data preprocessor may process the acquired data into a preset format so that the model learner 24 may use the acquired training data for learning for image recognition.

In addition, the learning data selector may select data necessary for learning from the learning data acquired by the learning data obtaining unit 23 or the learning data preprocessed by the preprocessing unit. The selected training data may be provided to the model learner 24. For example, the training data selection unit detects a specific region of the image acquired by the camera of the intelligent electronic device, and thus includes the training data selection unit in the specific region. It may further include a portion (not shown).

The model evaluator may input the evaluation data into the neural network model, and when the analysis result output from the evaluation data does not satisfy a predetermined criterion, may cause the model learner 22 to relearn. In this case, the evaluation data may be predefined data for evaluating the recognition model. For example, the model evaluator may evaluate that the predetermined criterion does not satisfy a predetermined criterion when the number or ratio of the evaluation data that is not accurate among the analysis results of the learned recognition model for the evaluation data exceeds a preset threshold.

The communication unit 27 may transmit the AI processing result by the AI processor 21 to an external electronic device.

The external electronic device may include an autonomous vehicle, a robot, a drone, an AR device, a mobile device, a home appliance, and the like.

For example, when the external electronic device is an autonomous vehicle, the AI device 20 may be defined as another vehicle or 5G network that communicates with the autonomous module vehicle. Meanwhile, the AI device 20 may be implemented by being functionally embedded in the autonomous driving module provided in the vehicle. In addition, the 5G network may include a server or a module that performs autonomous driving related control.

Meanwhile, the AI device 20 illustrated in FIG. 13 has been described functionally divided into an AI processor 21, a memory 25, a communication unit 27, and the like. It may also be called.

Figure 14:
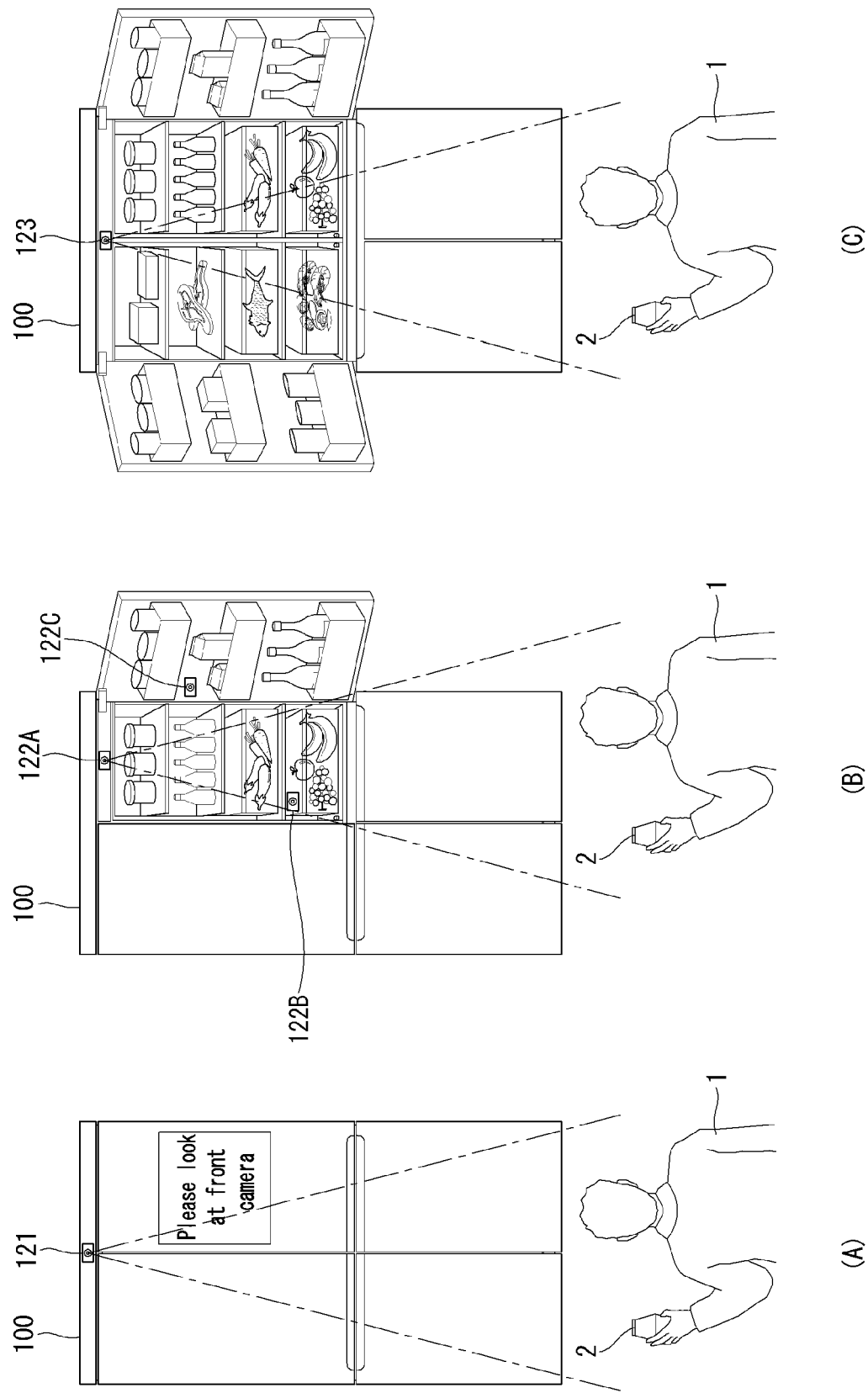
FIG. 14 shows an example of camera modules 121 to 123 of FIG. 12.

FIG. 14 shows an example of the camera modules 121 to 123 of FIG. 12.

As illustrated in FIG. 14(A), according to an embodiment of the present disclosure, the external camera module 121 of the user-customized food information providing apparatus 100 may capture images of a user 1 and food item 2 on the front of the user-customized food information providing apparatus 100.

As shown in FIG. 14(B), according to the embodiment of the present disclosure, a plurality of DID camera modules 122A, 122B, and 122C may captures images of food items 2 placed in each storage compartment.

As shown in FIG. 14(C), according to the embodiment of the present disclosure, the internal camera module 123 may capture an image of a food item 2 which is put in or taken out of an area inside the door. For example, the internal camera module 123 may capture an image of the user 1 who takes out the food item 2 from the storage compartment inside the door.

Figure 15:
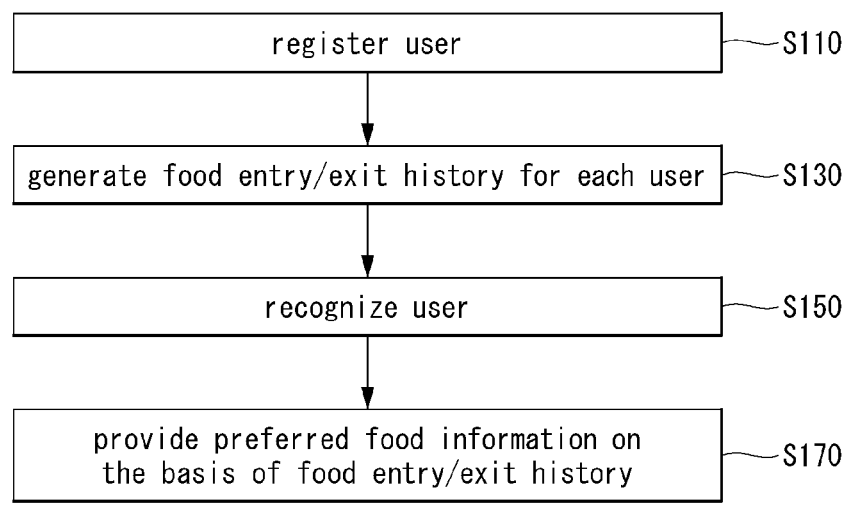
FIG. 15 is a flowchart illustrating a method for providing user-customized food information according to an embodiment of the present disclosure.

FIG. 15 is a flowchart illustrating a user-customized food information providing method according to an embodiment of the present disclosure.

As shown in FIG. 15, according to an embodiment of the present disclosure, the user-customized food information providing method for the user-customized food information providing apparatus 100 includes steps S110 to S170.

Specifically, the user-customized food information providing apparatus 100 performs a user registration process (S110). For example, the user-customized food information providing apparatus 100 may register a user on the basis of an input from the user or on the basis of an image of the user.

Next, the user-customized food information providing apparatus 100 may generate entry/exit history of food for each registered user (S130). For example, after the user is registered, the processor 140 of the user-customized food information providing apparatus 100 may generate entry/exit history for food which is put in or taken out after the corresponding user is recognized.

Thereafter, when a user's input is received from the outside, the user-customized food information providing apparatus 100 may recognize/classify the user (S150). For example, the user-customized food information providing apparatus 100 may receive a touch input for an operation of opening a door from the outside or the display 163. Upon receipt of the user input, the user-customized food information providing apparatus 100 may capture a front image and recognize/classify a user present in the front image using the previously learned face classification model.

Lastly, the user-customized food information providing apparatus 100 may provide information on food set as the user's preferred food on the basis of the food entry/exit history related to the recognized/classified user (S170). For example, the user-customized food information providing apparatus 100 may provide at least one of entry/exit history information on food frequently used by the recognized/classified user (e.g., food that the user has put in a predetermined number of times or more or has taken out a predetermined number of times or more), stock state information, and internal position information.

Figure 16:
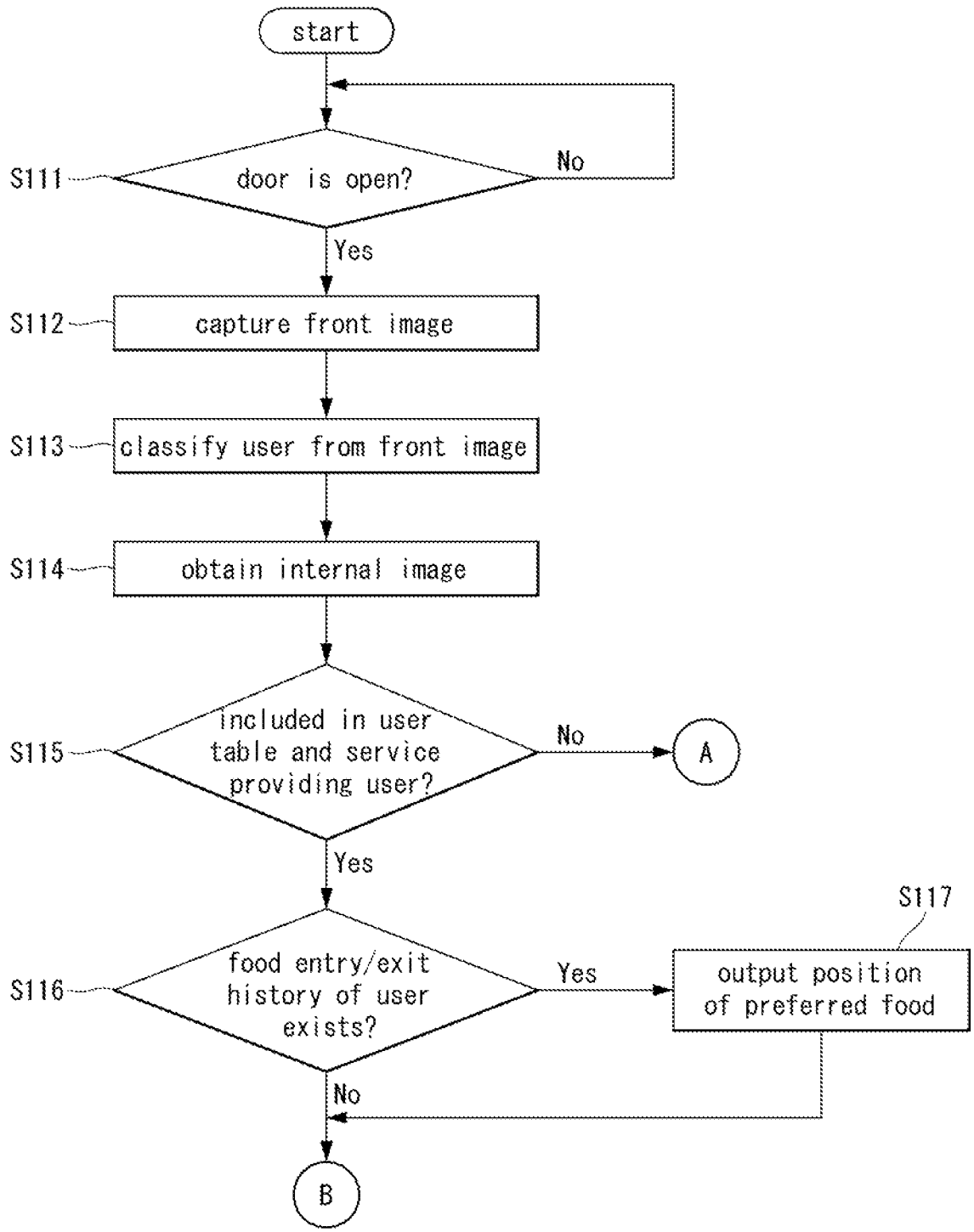
FIG. 16 is a flowchart illustrating a user registration procedure of FIG. 15.

FIG. 16 is a flowchart illustrating a user registration procedure of FIG. 15.

As shown in FIG. 16, according to an embodiment of the present disclosure, the processor 140 may determine whether a door of the user-customized food information providing apparatus 100 is opened (S111).

When the door is opened, the user-customized food information providing apparatus 100 may capture an image of the front side of the user-customized food information providing apparatus 100 using the front camera module 121 (S112).

Thereafter, the processor 140 may classify the user using the front image (S113). For example, the processor 140 may detect a face area of the user included in the front image and classify the user by inputting the face area into the previously learned face classification model.

Thereafter, the processor 140 may obtain/capture an image of the inside of the user-customized food information providing apparatus 100 (S114). For example, the processor 140 may capture an image of food inside the user-customized food information providing apparatus 100.

Thereafter, the processor 140 may determine whether the classified user is included in a previously stored user table and is registered as a service providing target (i.e., target to which a service is to be provided) (S115). For example, a pre-stored user table may include a list of users which have been previously classified once or more.

For example, the user table is shown in Table 1 below.

TABLE 1

| User ID | Name | Service availability | Usage number of times | Registration date | Face image or vector |
|---|---|---|---|---|---|
| 1 | User 1 | True | 55 | 2019 Jan. 1 09:00:10 | |
| 2 | User 2 | True | 1000 | 2019 Jan. 1 09:00:10 | |
| 3 | Automatically registered 1 | True | 11 | 2019 Jan. 1 09:00:10 | |
| 4 | Automatically registered 2 | False | 1 | | Unknown__1__1.jpg |
| 5 | Automatically registered 3 | False | 3 | | Unknown__2__1.jpg Unknown__2__2.jpg Unknown__2__3.jpg |

As shown in Table 1, the user table includes a field of user ID, a field of user's name for each user ID, a field of service availability for each user, a field of a usage number of times, a field of registration date, and a field of face image or vector.

The field of user ID may indicate an ID of each user in the form of a number. A predetermined number of user IDs, among the user IDs, may be allocated to users who are classified/recognized to exceed the predetermined number of times so as to be automatically registered.

The field of name may include the name of each user.

The field of service availability may include a value of TRUE if the number of times an automatically registered user, among the users, is classified/recognized is equal to or greater than a predetermined number of times, or a value of FALSE if the number of times is less than the predetermined number of times.

The field of usage number of times may include a value of the number of times each user is classified/recognized or the number of times each user has opened and closed the door.

The registration date may include the date when each user is registered in the user table in order of year, date, and time.

The field of face image or vector may include a file name of each user's face image or a feature value extracted from the face image.

If it is determined that the classified user is included in the user table and is registered as a service providing target, the processor 140 may determine whether there is entry/exit history of food related to the classified user (S116).

When there is entry/exit history of food related to the classified user, the processor 140 may output a position (e.g., a storage compartment) of preferred food (e.g., food which has put in or taken out a predetermined number of times or more) of the classified user through the input/output unit 160 (S117).

Figure 18:
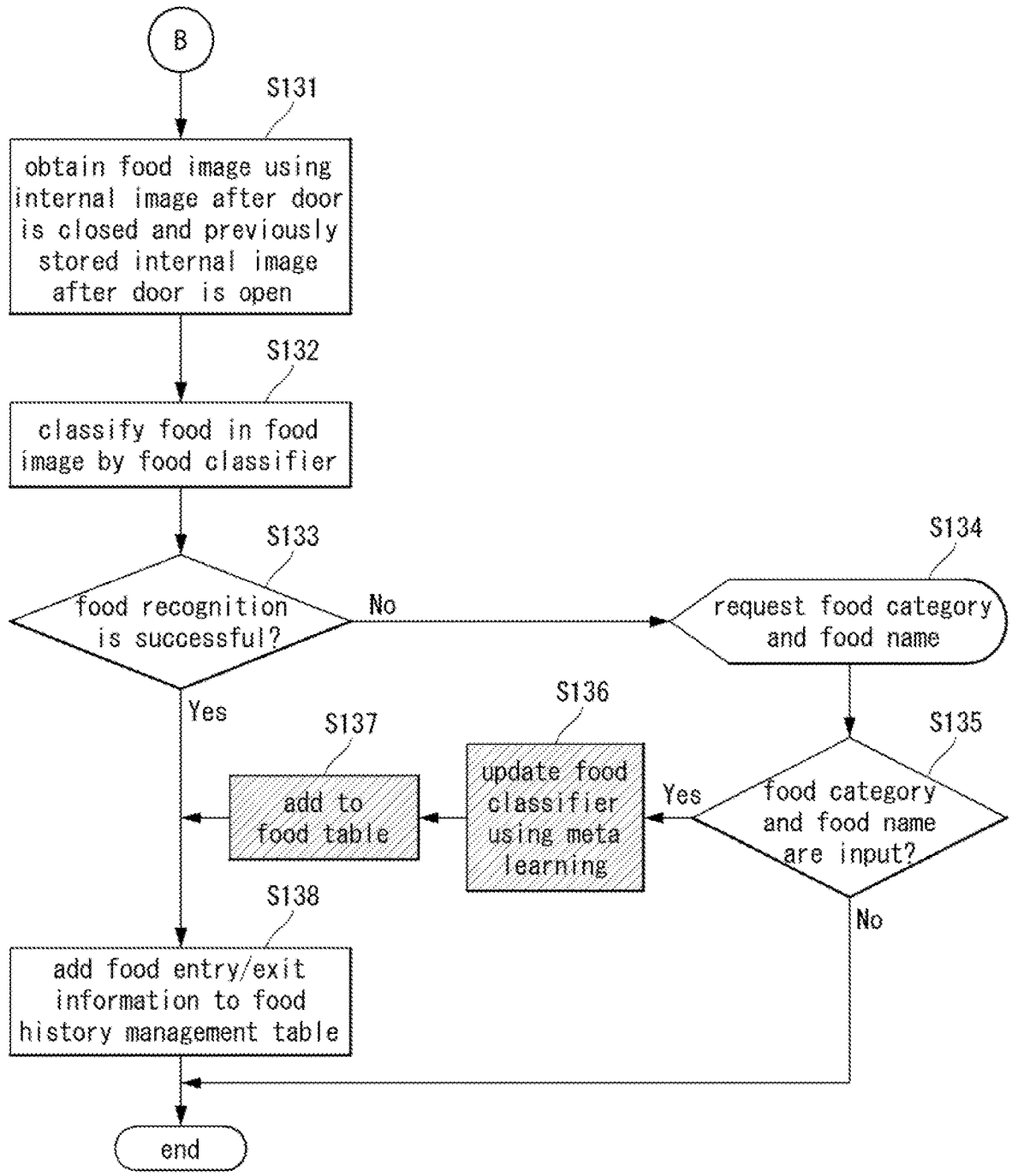
FIG. 18 is a flowchart illustrating a procedure (procedure B in FIG. 16) for updating food entry/exit history related to a classified user.

If there is no entry/exit history of food related to the classified user, the processor 140 may perform a procedure B (the procedure shown in FIG. 18). The procedure B will be described in detail with reference to FIG. 18.

Figure 17:
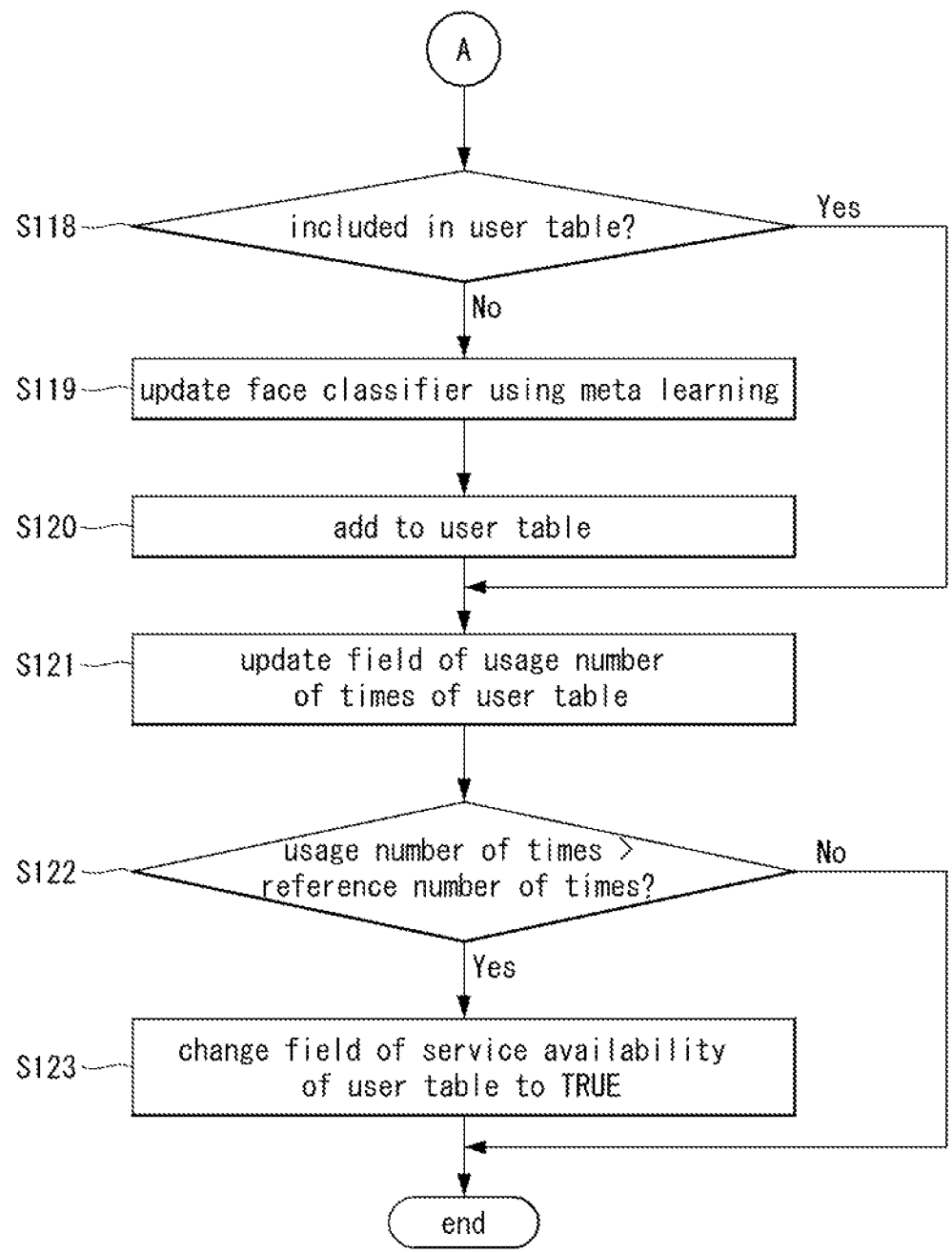
FIG. 17 is a flowchart illustrating a procedure (procedure A in FIG. 16) for registering a classified user as a service providing target.

If it is determined that the classified user is included in the user table but is not registered as a service providing target, if the classified user is not included in the user table but is registered as a service providing target, of if the classified user is not included in the user table and is not registered as a service providing target, the processor 140 may perform a procedure A (the procedure of FIG. 17). The procedure A will be described in detail with reference to FIG. 17.

FIG. 17 is a flowchart illustrating a procedure (procedure A in FIG. 16) for registering a classified user as a service providing target.

As shown in FIG. 17, according to an embodiment of the present disclosure, the procedure of registering a classified user as a service providing target may include steps S118 to S123.

Specifically, according to an embodiment of the present disclosure, the processor 140 may determine whether a currently classified user is included in the user table (a user list that has been classified once or more) (S118).

If the currently classified user is not included in the user table, the processor 140 may update/learn the face classifier/classification model using meta learning for the image of the classified user (S119). For example, unlike a general learning process of learning a model using all available data, meta learning refers to a process of performing learning on a model using only a predetermined number of data among available data. For example, the processor 140 may learn the previously generated face classification model using only a predetermined number of feature values among a plurality of feature values included in the face image of the classified user captured by the front camera module 121.

Thereafter, the processor 140 may add the classified user to the user table, which is a list of pre-classified users (S120).

If the classified user is included in the user table in step S118 or after step S120, the processor 140 may update the field of usage number of times (number of times food information providing service is used or classified number of times) of the user table for the classified user (S121).

The processor 140 may determine whether the usage number of times of the service of the classified user is greater than a predetermined reference number of times on the basis of the field of updated usage number of times (S122). For example, the reference number of times may be previously set by the user or a manufacturer, and the processor 140 may determine whether the usage number of times of the service of the classified user exceeds the reference number of times in the field of the updated usage number of times.

If it is determined that the usage number of times does not exceed the reference number of times, the processor 140 terminates the user registration procedure (procedure A).

Meanwhile, if it is determined that the usage number of times exceeds the reference number of times, the processor 140 may change the field of service availability (field of registration) of the user table of the classified user to TRUE (S123). That is, if the usage number of times exceeds the reference number of times, the processor 140 may register the classified user.

FIG. 18 is a flowchart illustrating a procedure (procedure B in FIG. 16) for updating a food entry/exit history related to a classified user.

As shown in FIG. 18, according to the embodiment of the present disclosure, the procedure of updating the food entry/exit history related to the classified user may include steps S131 to S138.

Specifically, the processor 140 may obtain a food image using an internal image after the door of the user-customized food information providing apparatus 100 is closed and a previously stored internal image after the door is opened (S131). For example, the processor 140 may capture an image of the internal area of a storage compartment after the door is closed using the DID camera module 122 to obtain a food image after the door is closed and capture an image of the internal area of the storage compartment in an opened state before the door is closed to obtain a food image before the door is closed. Thereafter, the processor 140 may detect a difference image between the food image after the door is closed and the food image before the door is closed.

Thereafter, the processor 140 may attempt to classify the food included in the food image after the door is closed and the food image before the door is closed using the previously learned food classifier/classification model (S132). For example, the processor 140 may generate a food classifier or a food classification model in advance, and attempt to classify the food in the food image using the food classifier or the food classification model.

Next, the processor 140 may determine whether recognition/classification of the food is successful (S133).

If it is determined that the food classification fails, the processor 140 may request a food category and a food name using the display 163 (S134). For example, if the food classification fails, the processor 140 may output the text "Enter food category and food name" via the display 163.

The processor 140 may then determine whether a food category and/or a food name is input via the display 163 (S135). For example, the processor 140 may previously set a threshold time and determine whether an input for the food category and/or an input for the food name is received within the predetermined threshold time after requesting the food category and food name via the display 163.

If it is determined that the food category and/or the food name are input, the processor 140 may update the food classifier/classification model using a predetermined number of feature values, a food category, and/or food name from the food image using meta learning (S136).

The processor 140 may then add the food to the food table (S137).

An example of the food table is shown in Table 2 below.

TABLE 2

| Class ID | Class name | Category |
| --- | --- | --- |
| 1 | White milk | Dairy product |
| 2 | Chocolate milk | Dairy product |
| ... | Dairy product 3 | Dairy product |
| 100 | ... | Dairy product |
| 201~300 | | Juice |

TABLE 2-continued

| Class ID | Class name | Category |
| --- | --- | --- |
| 301~400 | | Source |
| ... | | ... |
| ... | | ... |

As shown in Table 2, the food table may include a class ID field, a class name field, and a category field.

The class ID field may include an identifier for identifying each food in the form of a number.

The class name field may include the name of each food.

The category field may include a type of each food.

If no food category or food name is input in step S135, the processor 140 terminates the food entry/exit input update procedure (procedure B).

If it is determined that the food recognition/classification attempt is successful in step S133 or after step S137, the processor 140 may add entry or exit information (entry/exit information) of the corresponding food to a food history management table (S138).

Table 3 below shows the food history management table.

TABLE 3

| User | Date | Entry/exit | Food class |
| --- | --- | --- | --- |
| User 1 | 2019 Jan. 1 12:21:24 | Entry | ID 3 |
| User 2 | 2019 Jan. 1 14:30:20 | Exit | ID 3 |
| User 1 | 2019 Jan. 5 12:19:21 | Entry | ID 5 |
| User 1 | 2019 Jan. 5 12:22:24 | Entry | ID 1 |
| ... | ... | ... | ... |

As shown in Table 3, the food history management table may include a user field, a date field, an entry/exit field, and a food class field.

The user field may include a name value of a user.

The date field indicates a date in which each user puts in or takes out food.

The entry/exit field indicate "entry" when each food item is received (put in), and "exit" when each food item is removed (taken out).

The food class field indicates an identifier (ID) of food which is put in or taken out.

Figure 19:
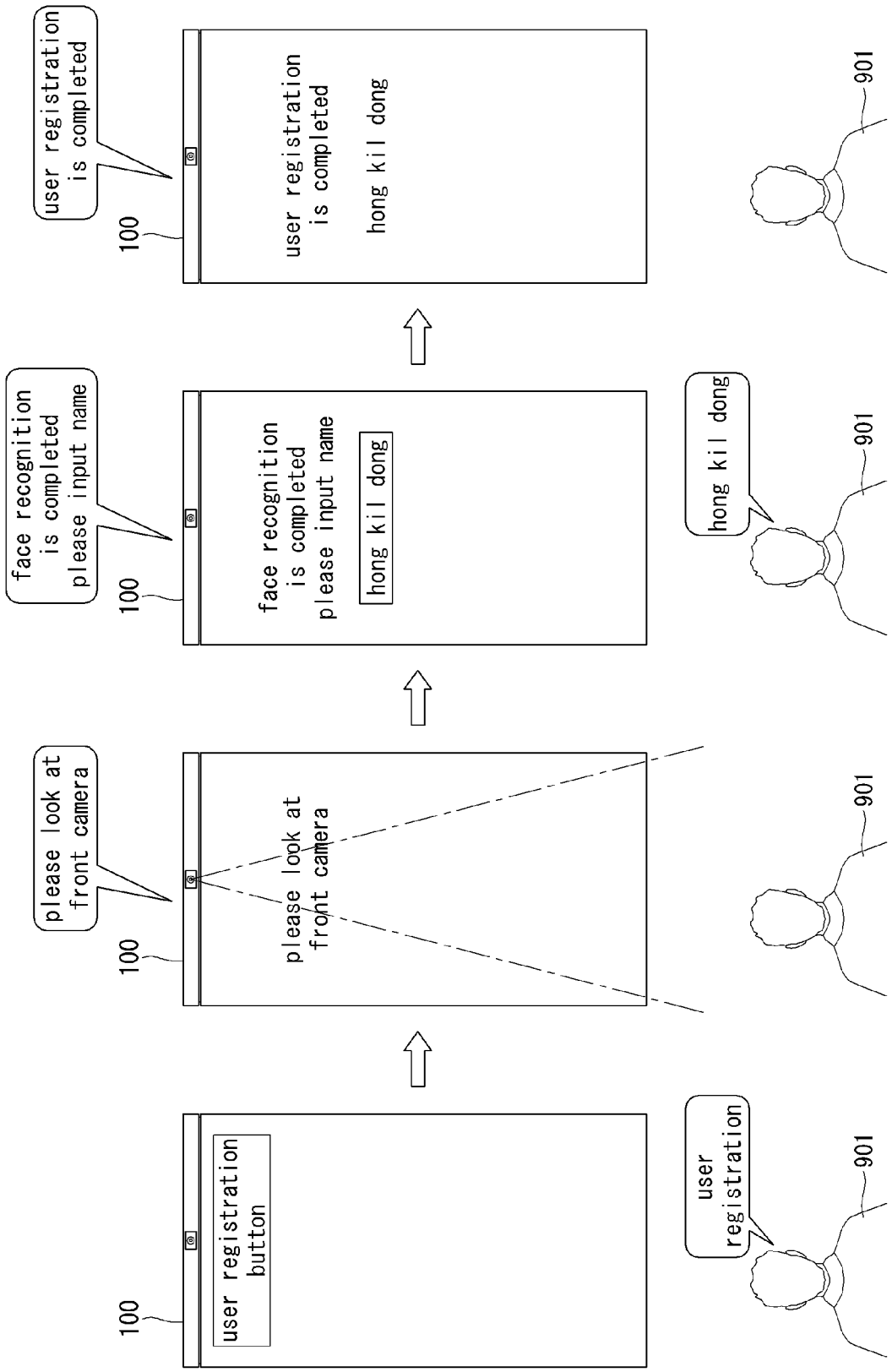
FIG. 19 illustrates a procedure of registering a user by a user-customized food information providing apparatus.

FIG. 19 illustrates a procedure of registering a user by a user-customized food information providing apparatus.

As shown in FIG. 19, for example, the user-customized food information providing apparatus 100 may obtain a user registration request in the form of an audio signal of "Please register user" of a user 901 through a microphone. Also, for example, the user-customized food information providing apparatus 100 may display a "user registration button" via the display 163 and obtain a user registration request through an input of the user 901 regarding the "user registration button".

Thereafter, the user-customized food information providing apparatus 100 may output an audio signal of "Please look at front camera" through the speaker. Further, the user-customized food information providing apparatus 100 may display text of "Please look at the front camera" through the display 163.

Next, the user-customized food information providing apparatus 100 may capture an image of the user 901 using the front camera, and after the image capturing is completed, the processor 140 may classify/recognize the user 901 using the captured image.

When the classification/recognition of the user 901 is completed, the user-customized food information providing apparatus 100 may output an audio signal of "Face recognition is completed. Please input name" through the speaker. Also, when the classification/recognition of the user 901 is completed, the user-customized food information providing apparatus 100 may display text of "Face recognition is completed. Please input name".

Subsequently, the user-customized food information providing apparatus 100 may obtain a name of the user from the user 901 in the form of an audio signal of "Hong Kil Dong".

When the name of the user is obtained in the form of an audio signal of "Hong Kil Dong", the user-customized food information providing apparatus 100 may register an image of the user together with the name of the user and output an audio signal of "Registration is completed" through the speaker. Further, the user-customized food information providing apparatus 100 may register the image of the user together with the name of the user and display text of "Registration is completed" and the user name of "Hong Kil Dong" in the form of text through the display 163.

Figure 20:
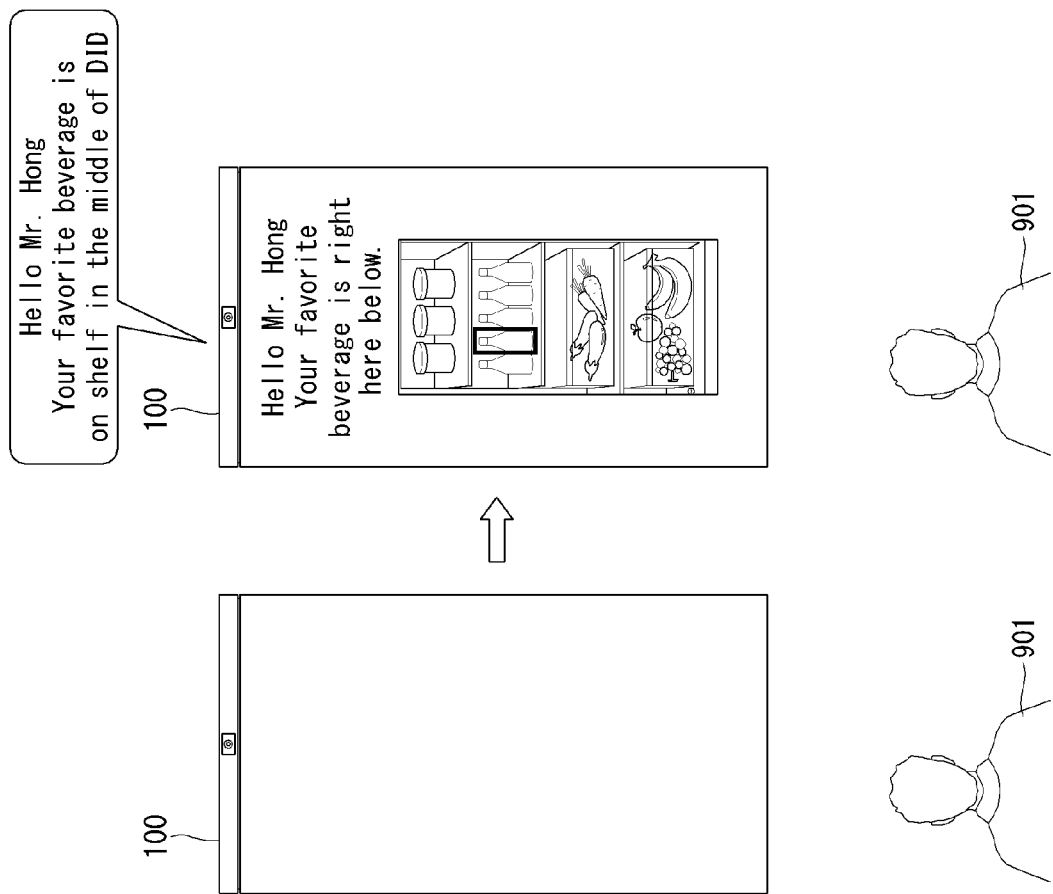
FIG. 20 shows an example of providing a preferred food position of each user.

FIG. 20 shows an example of providing a position of preferred food for each user.

As shown in FIG. 20, the processor 140 of the user-customized food information providing apparatus 100 may recognize/classify the user 901 as a user named "Hong Kil Dong". Once the recognition/classification of the user 901 is completed, the processor 140 may retrieve food entry/exit history related to the user 901. After retrieving the food entry/exit history related to the user 901, the processor 140 may determine preferred food of the user 901 on the basis of the food entry/exit history.

For example, if it is determined that preferred food of the user 901 is "beverage", the processor 140 may display, via the display 163, a real-time captured image for the inside of a storage compartment where the "beverage" is kept using the DID camera module, together with text of "Hello, Mr. Hong. Your favorite beverage is right here below". Further, the processor 140 may output an audio signal of "Hello, Mr. Hong. Your favorite beverage is on a shelf in the middle of DID".

Figure 21:
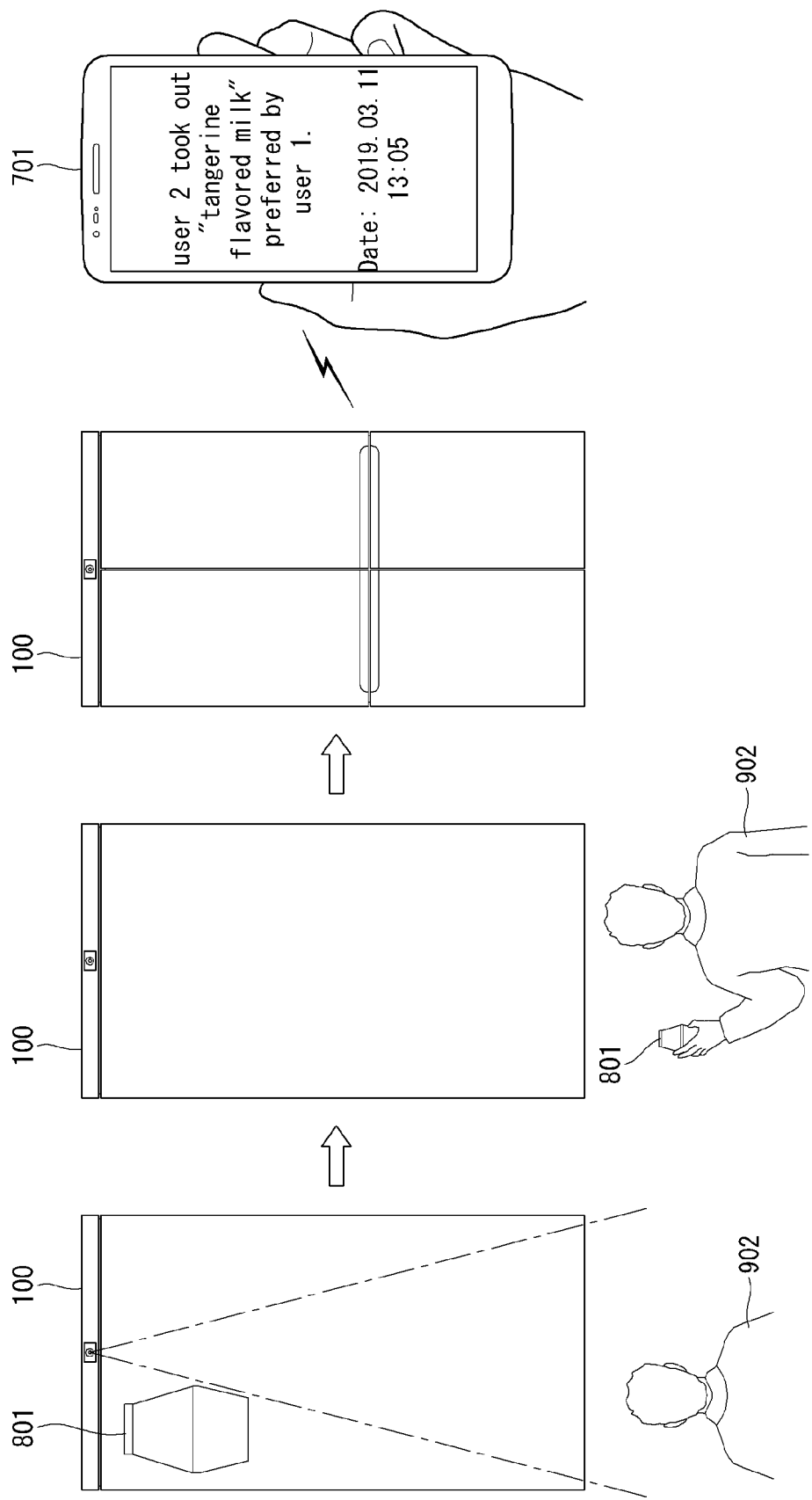
FIG. 21 shows an example of providing a user with information indicating that another user has taken out preferred food.

FIG. 21 shows an example of providing a user with information indicating that another user takes out preferred food.

As illustrated in FIG. 21, the user-customized service providing apparatus 100 may recognize a situation where another user 902 opens the door, takes out "tangerine flavored milk" 801 inside a storage compartment, and closes the door. For example, in a case where the door is closed after the door is opened and the "tangerine flavored milk", which is preferred food of the user 901, is taken out from the food in the storage compartment, the user-customized food information providing apparatus 100 may recognize the user 902 by capturing a front image when the door is opened before the "tangerine flavored milk" which is the preferred food of the user 901 is taken out, and determine whether the user 901 registered as the user of the "tangerine flavored milk" and the classified/recognized another user 902 match each other. For example, the processor 140 compares a face image of the user 901 registered as the user of the "tangerine flavored milk" 801 with a face image of the other classified/recognized user 902 and determine whether similarity between the two images is equal to or greater than a predetermined threshold value, thereby determining whether the two users 901 and 902 match each other.

For example, when it is determined that the user 901 registered as the user of the "tangerine flavored milk" 801 does not match the other identified/recognized user 902, the user-customized food information providing device 100 may transmit information indicating that the "tangerine flavored milk" was taken out by the other user 902 to the external mobile terminal 701 in which a user account of the user 901 in which the "tangerine flavored milk" 800 is registered as preferred food is registered through a wireless communication system. For example, the information indicating that the "tangerine flavored milk" 801 was taken out by the other user 902 may include a name (user 2) of the other user 902 who has taken out the "tangerine flavored milk" 801, and exit date information (13:05, Mar. 11, 2019).

The wireless communication system formed between the user-customized food information providing apparatus 100 and the external mobile terminal 701 may be a communication system including a 5G communication system. That is, the user-customized food information providing apparatus 100 may transmit information indicating that the "tangerine flavored milk" 801 has been taken out by the other user 902 to the external mobile terminal 701 through the 5G communication system.

Specifically, the user-customized food information providing apparatus 100 and the external mobile terminal 701 may exchange data through machine type communication (MTC), which is one type of wireless data communication. Here, the MTC is a type of data communication including one or more machines and may be applied to machine-to-machine (M2M) or Internet-of-things (IOT). Here, a machine refers to an entity that does not require direct operation or intervention of a person. For example, the machine includes a smart meter equipped with a mobile communication module, a vending machine, a portable terminal having an MTC function, and the like. MTC may be used together with terms such as eMTC, LTE-M1/M2, bandwidth reduced low complexity/coverage enhanced (BL/CE), non-BL UE (in enhanced coverage), NR MTC, enhanced BL/CE, may be mixed. In addition, the MTC terminal/apparatus includes a terminal/apparatus having an MTC function (e.g., a smart meter, a bending machine, and a mobile terminal having an MTC function), or equivalent other terms.

In the example of FIG. 21, the user-customized food information providing apparatus 100 and the external mobile terminal 701 may be connected to an external MTC base station (not shown) using a wireless access technology of a 5G wireless communication system. Here, the MTC base station may be a home IoT server but is not necessarily limited thereto. Meanwhile, the user-customized food information providing apparatus 100 and the external mobile terminal 701 may transmit and receive data through the MTC base station or directly transmit and receive data without using the MTC base station.

The external MTC server (not shown) may be connected to the user-customized food information providing apparatus 100 and the external mobile terminal 701 and provide the user-customized food information providing apparatus 100 and the external mobile terminal 701 with an MTC service. The service provided through MTC is different from those of existing services interfered by a human. Through MTC, various categories of services such as tracking, metering, payment, medical services, remote control, and the like, may be provided. For example, services such as meter reading, water level measurement, use of surveillance cameras, and inventory reporting of vending machines, and the like, may be provided through MTC.

First, the user-customized food information providing apparatus 100 and the external mobile terminal 701 may access the MTC base station as described above in the 'MTC signal transmission/reception method'. Specifically, the user-customized food information providing apparatus 100 and the external mobile terminal 701 may perform an initial cell search in synchronization with the MTC base station. Next, the user-customized food information providing apparatus 100 and the external mobile terminal 701 may receive a physical broadcast channel (PBCH) signal from the MTC base station to obtain in-cell broadcast information. Thereafter, the user-customized food information providing apparatus 100 and the external mobile terminal 701 may receive MTC PDCCH (MPDCCH) and a corresponding PDSCH to obtain specific system information to be connected to the MTC base station. Thereafter, the user-customized food information providing apparatus 100 and the external mobile terminal 701 may perform a random access procedure to complete accessing the MTC base station.

When the access procedure is completed, the user-customized food information providing apparatus 100 and the external mobile terminal 701 may receive an MPDCCH signal and/or PDSCH signal and transmit a physical uplink shared channel (PUSCH) signal and/or a physical uplink control channel (PUCCH) signal as a general process of transmitting/receiving an uplink/downlink signal. That is, the user-customized food information providing apparatus 100 may transmit data through the PUSCH and/or the PUCCH to the MTC base station in the 5G wireless communication system including the MTC base station and/or the MTC server. The external mobile terminal 701 may receive the data transmitted by the user-customized food information providing apparatus 100 through the MPDCCH resource and/or the PDSCH resource, which are downlink physical resources, from the MTC base station. Specifically, in the case of FIG. 21, the user-customized food information providing apparatus 100 may transmit information indicating that the "tangerine flavored milk" 801 was taken out by the other user 902 through the PUSCH and/or the PUCCH to the 5G wireless communication system, and the external mobile terminal 701 may receive information indicating that the "tangerine flavored milk" 801 was taken out by the other user 902 through the MPDCCH resource and/or the PDSCH resource from the 5G wireless communication system.

Meanwhile, the user-customized food information providing apparatus 100 and the external mobile terminal 701 may transmit and receive data using a narrowband-Internet of things (NB-IoT) communication system, which is a system for supporting low complexity and low power consumption, through a system bandwidth (BW) corresponding to one resource block (RB) of the 5G wireless communication system (or LTE system).

First, the user-customized food information providing apparatus 100 and the external mobile terminal 701 may perform initial access to the MTC base station through an anchor-type carrier (i.e., an anchor carrier, anchor PRB) which is a carrier that transmits NPSS, NSSS, NPBCH, and NPDSCH for system information block (N-SIB).

When the initial access procedure is completed, the user-customized food information providing apparatus 100 and the external mobile terminal 701 may exchange data through a non-anchor type carrier (i.e., a non-anchor carrier, non-anchor PRB). Generally, a downlink physical channel and a physical signal of the NB-IoT may be set to be transmitted on the basis of a time domain multiplexing scheme and/or a frequency domain multiplexing scheme. In the case of FIG. 21, the user-customized food information providing apparatus 100 and the external mobile terminal 701 may receive data through a narrowband physical broadcast channel (NPBCH), a narrowband physical downlink control channel (NPDCCH), a narrowband physical downlink shared channel (NPDSCH) which are downlink physical channels of NB-IoT, and transmit data through a narrowband physical random access channel (NPRACH) and a narrowband physical uplink shared channel (NPUSCH). Specifically, the user-customized food information providing apparatus 100 may transmit information indicating that the "tangerine flavored milk" 801 was taken out by the other user 902 to the 5G wireless communication system via NPUSCH format 1 and the external mobile terminal 710 may receive information indicating that the "tangerine flavored milk" 801 was taken out by the other user 902 through the NPDSCH.

The external mobile terminal 701 may output information indicating that the "tangerine flavored milk" 801 was taken out by the other user 902 in a text form of "user 1 took out "tangerine flavored milk" preferred by user 1. Date: 2019 Mar. 11 13:05".

Figure 22:
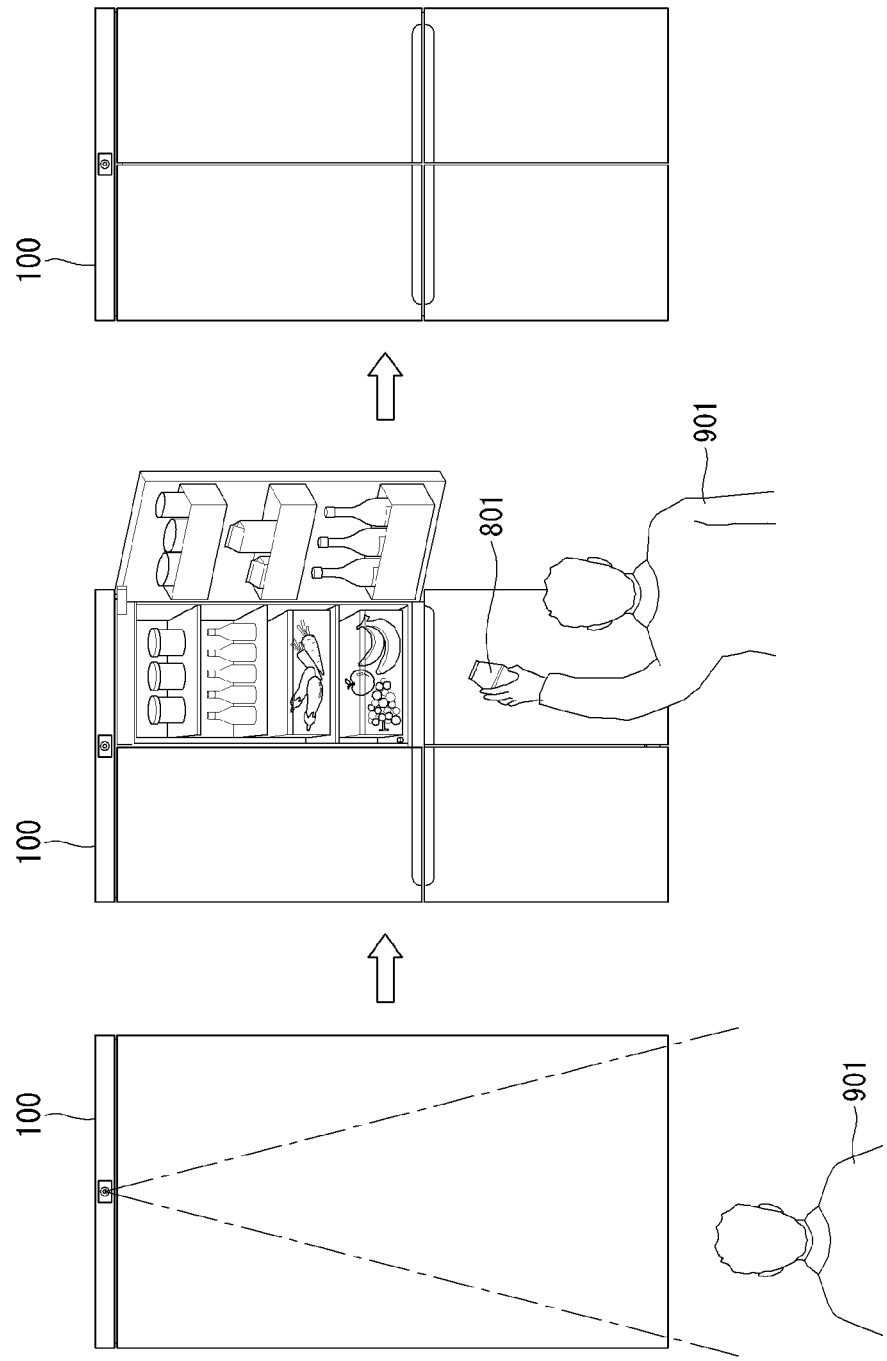
FIG. 22 shows an example of updating food entry/exit history for each user.

FIG. 22 shows an example of updating user food entry/exit history for each user.

As shown in FIG. 22, when the door is opened, the user-customized food information providing apparatus 100 may capture an image of the user 901 and classify/recognize the user 901.

Next, the user-customized food information providing apparatus 100 may capture an image of a situation in which food 801 is put into one of internal spaces of the storage compartments by the user 901 using the front camera module 121, the DID camera module 122, and the internal camera module 123.

Thereafter, when the door is closed, the user-customized food information providing apparatus 100 may add entry information on the food 801 put in by the user 901 to the entry/exit history on the previously stored food 801 as shown in Table 3.

Figure 23:
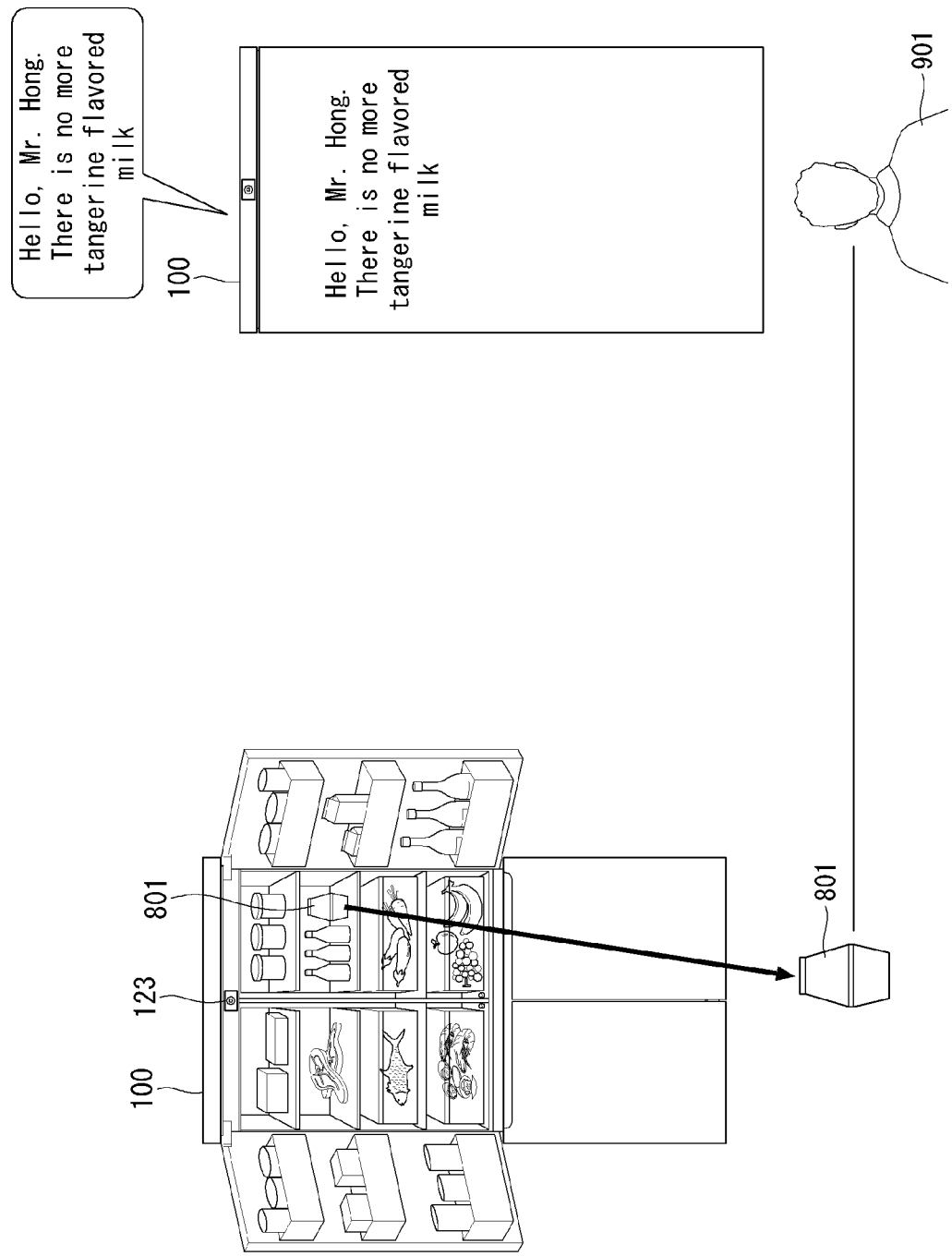
FIG. 23 shows an example of providing stock information as an example of user-customized food information.

FIG. 23 shows an example of providing stock information as an example of user-customized food information.

As shown in FIG. 23, the user-customized food information providing apparatus 100 may recognize/classify the user 901 as a user named "Hong Kil Dong".

After the user 901 is recognized/classified, the user-customized food information providing apparatus 100 may determine that preferred food of the user 901 is "tangerine flavored milk" 801.

After determining that the preferred food of the user 901 is the "tangerine flavored milk" 801, the user-customized food information providing device 100 may check stock information of the "tangerine flavored milk" 801.

If it is determined that there is no stock of "tangerine flavored milk" 801, the user-customized food information providing apparatus 100 may output an audio signal of "Hello, Mr. Hong. There is no more tangerine flavored milk" through a speaker. Further, if it is determined that there is no stock of "tangerine flavored milk" 801, the user-customized food information providing apparatus 100 may display text of "Hello, Mr. Hong. There is no more tangerine flavored milk" through the display 163.

Figure 24:
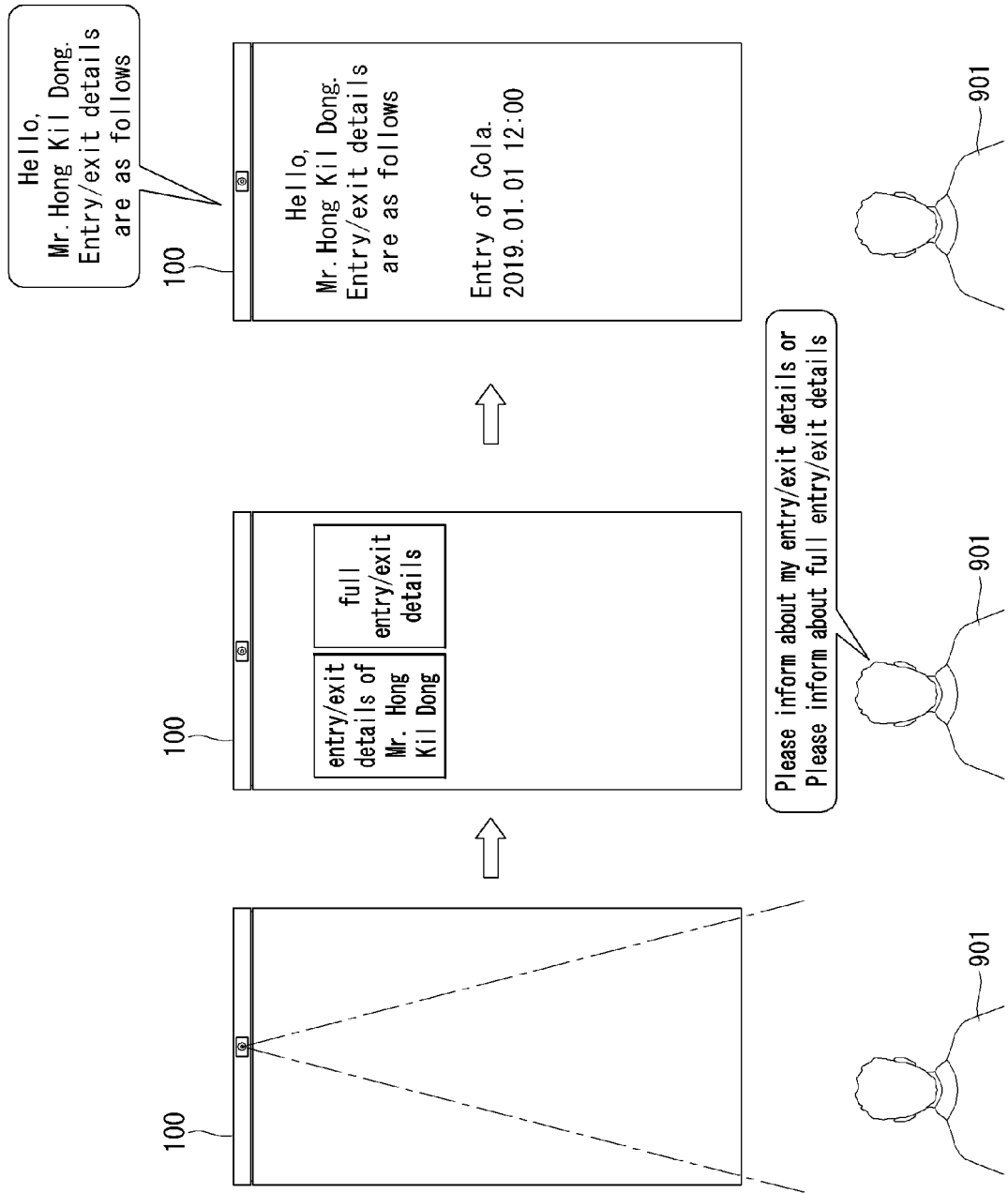
FIG. 24 shows an example of providing food entry/exit history as an example of user-customized food information.

FIG. 24 shows an example of providing food entry/exit history as an example of user-customized food information.

As shown in FIG. 24, the user-customized food information providing apparatus 100 may recognize the user 901 (Hong Kil Dong) and then display a menu "entry/exit details of Mr. Hong Kil Dong" and a menu of "full entry/exit details" simultaneously on the display 163.

The user-customized food information providing apparatus 100 may receive a touch input from the user 901 via the display 163 for a menu of "Hong Gil-Dong's entry/exit details" and a menu "full entry and exit details". Also, the user-customized food information providing apparatus 100 may obtain an audio such as "Please inform about may entry/exit details" or "Please inform about full entry/exit details" from the user 901 through a microphone.

Thereafter, the user-customized food information providing apparatus 100 may display text of "Hello, Mr. Hong Kil Dong. Entry/exit details are as follows. Entry of Cola. 2019.01.01. 12:00" through the display 163, while outputting an audio signal of "Hello, Mr. Hong Kil Dong. Entry/exit details are as follows" through the speaker.

Figure 25:
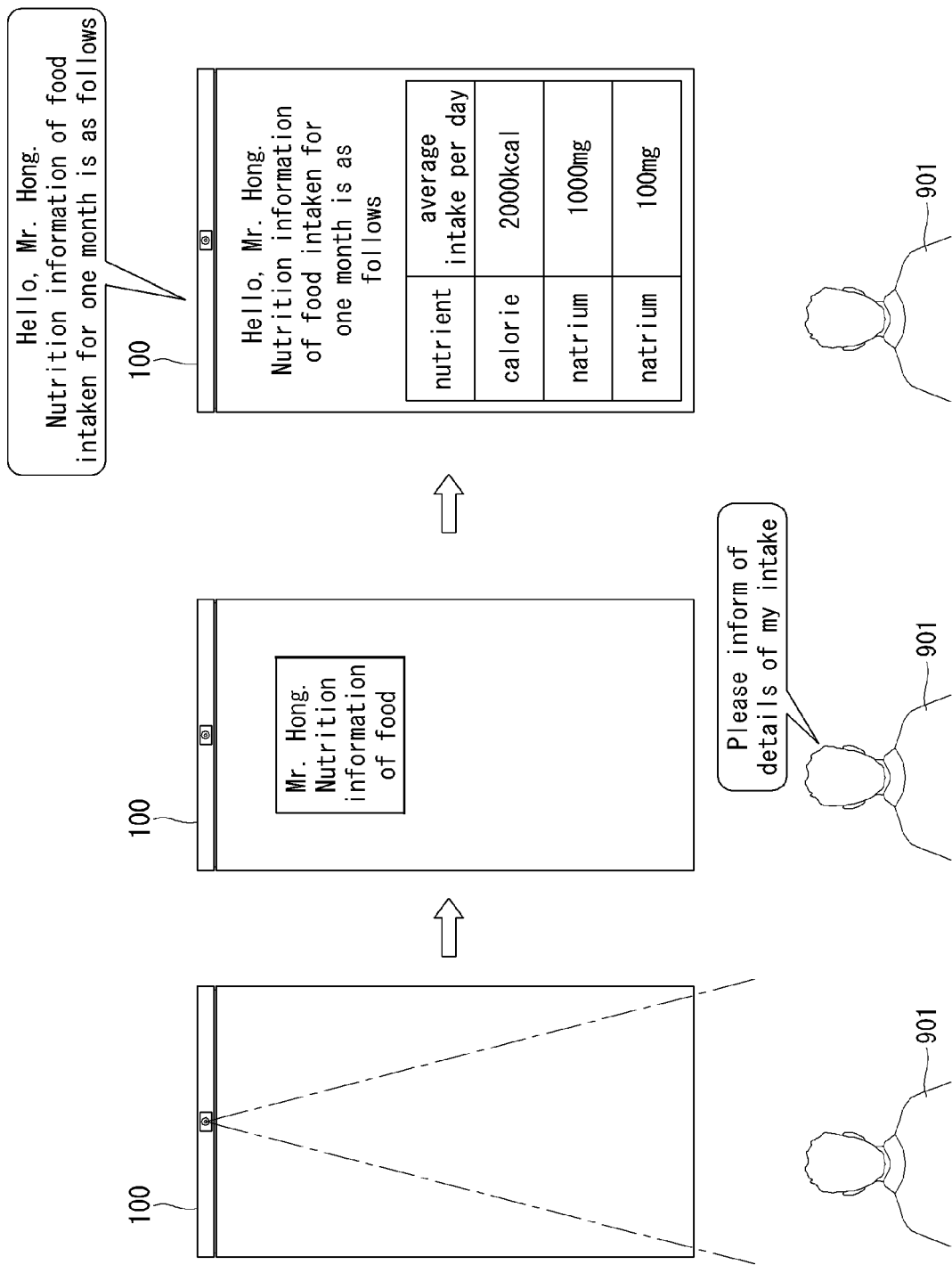
FIG. 25 shows an example of providing ingestion information of each user as an example of user-customized food information.

FIG. 25 shows an example of providing ingestion information of each user as an example of user-customized food information.

As illustrated in FIG. 25, the user-customized food information providing apparatus 100 may recognize/classify the user 901 (Hong Kil Dong) and subsequently obtain an audio signal of "Please inform of details of my intake" from the user 901 or receive a touch input for a menu of "Nutrition information of Hong Gil Dong" displayed through the display 163.

When the user receives an audio signal of "Please inform about details of my intake" from the user 901 or receives a touch input for the menu "Nutrition information of Hong Gil Dong" displayed on the display 163, the user-customized food information providing apparatus 100 may display text of "Hello, Mr. Hong. Nutrition information of food intaken for one month is as follows" and nutrition information in a table form (nutrient field, field of average intake of each nutrient per day) through the display 163, while outputting an audio signal of "Hello, Mr. Hong. Nutrition information of food taken for one month is as follows".

Figure 26:
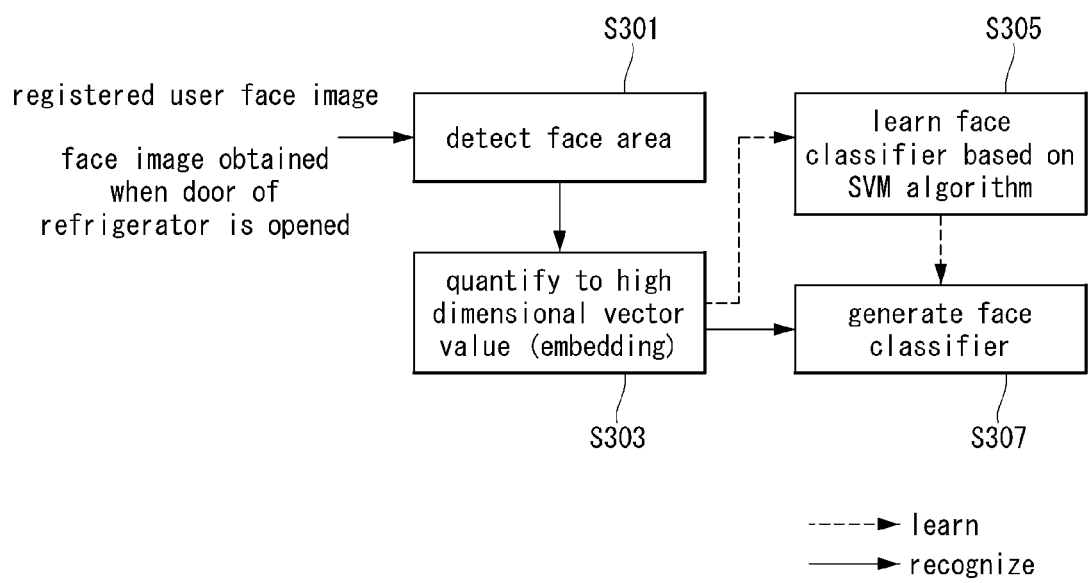
FIG. 26 illustrates a process of generating/learning a face classifier/classification model.

FIG. 26 shows a process of generating/learning a face classifier/classification model.

As shown in FIG. 26, the processor 140 may detect a face area using a registered user face image received from the user or a face image obtained when a refrigerator door is opened (S301).

After detecting the face area, the processor 140 may quantify the detected face area as a high dimensional vector value (S303).

Figure 27:
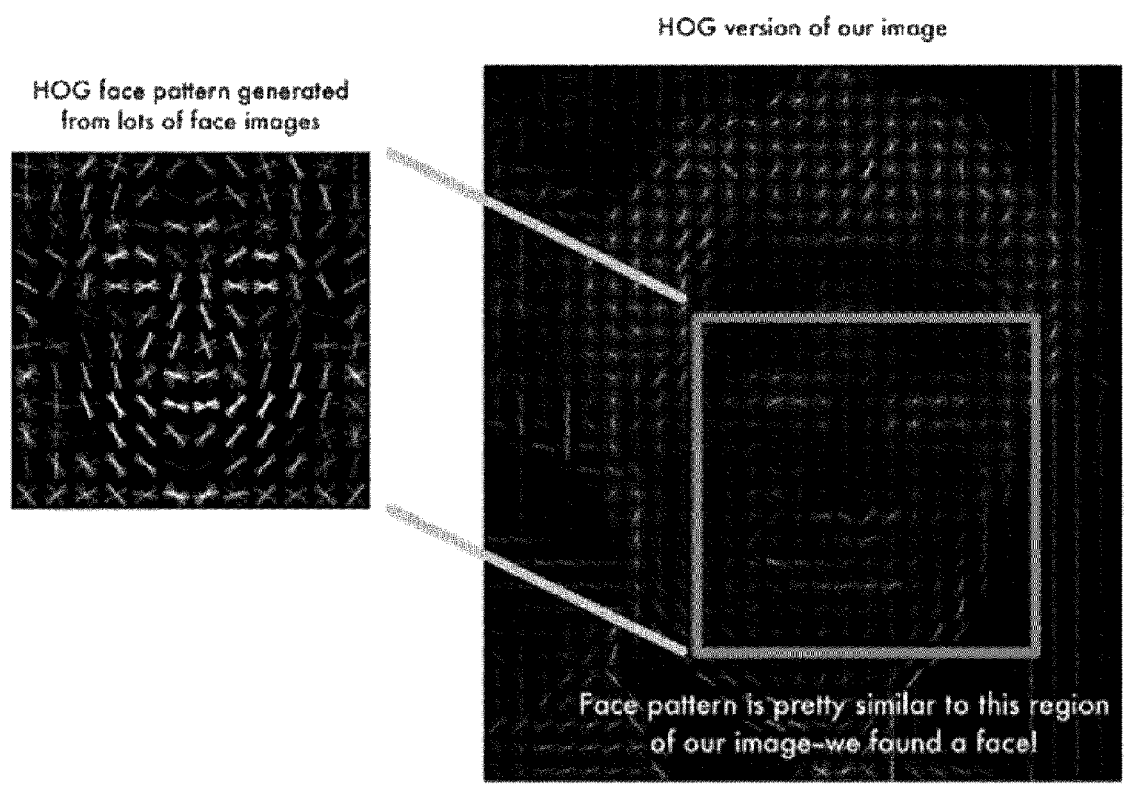
FIG. 27 shows an example in which high-dimensional vector values are quantified from a face area.

FIG. 27 shows an example in which the face area is quantified into a high dimensional vector value.

As shown in FIG. 27, the processor 140 may obtain the HOG face pattern (HOG face pattern) as shown on the left side of the face area.

Next, the processor 140 may obtain a HOG version which is a vector value from the HOG face pattern.

Referring again to FIG. 26, the processor 140 may learn a face classifier based on an SVM algorithm (S305), while generating a face classifier using the quantified vector value (S307).

As described above with reference to FIGS. 17 and 18, the processor 140 may learn the face classifier/classification mode by applying a meta learning algorithm performing learning using only a predetermined number of data.

Figure 28:
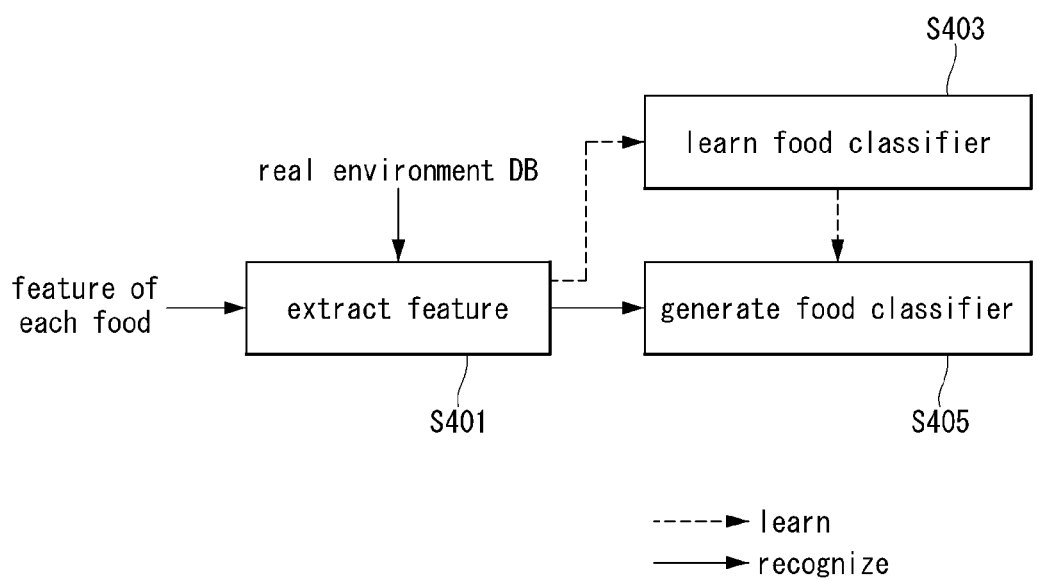
FIG. 28 shows a process of generating/learning a food classifier.

FIG. 28 shows a process of generating/learning a food classifier.

As shown in FIG. 28, the processor 140 may extract features values of each food from a difference image obtained by capturing an image of the food and features from the actual environment database (real environment DB) (S401).

FIG. 29 shows a process of obtaining a difference image.

As shown in FIG. 29(A), the processor 140 may obtain a pre-entry image of a product before the door is closed and a post-entry image obtained after the door is closed using the DID camera module, and obtain a food area using a difference between the two images.

As shown in FIG. 29(B), the processor 140 may obtain a pre-exit image of a product before the door is closed and a post-exit image obtained after the door is closed using the DID camera module, and obtain a food area using a difference between the two images.

Referring again to FIG. 28, the processor 140 may extract features of the food to generate a food classifier/classification model (S405), and learn the food classifier/classification model using the extracted features of the food (S403).

As described above with reference to FIGS. 17 and 18, the processor 140 may learn the food classifier/classification model by applying the meta learning algorithm performing learning using only a predetermined number of data.

The present disclosure may be implemented as a computer-readable code in a medium in which a program is written. The computer-readable medium includes all types of recording devices in which data readable by a computer system is stored. Examples of the computer-readable medium include a hard disk drive (HDD), a solid state disk (SSD), a silicon disk drive (SDD), ROM, RAM, CD-ROM, magnetic tapes, floppy disks, and optical data storages, and also include that the computer-readable medium is implemented in the form of carrier waves (e.g., transmission through the Internet). Accordingly, the detailed description should not be construed as being limitative from all aspects, but should be construed as being illustrative. The scope of the present disclosure should be determined by reasonable analysis of the attached claims, and all changes within the equivalent range of the present disclosure are included in the scope of the present disclosure.

What is claimed is:

1. A method for providing user-customized food information, the method comprising:
   classifying a user as a registered user or a new user in response to an input received from the user or a captured face image of the user;
   determining whether to register the classified user as a service providing target based on a number of times the user is classified such that the classified user is registered as the service providing target when the number of times exceeds a predetermined threshold value;
   retrieving entry/exit history of food associated with the classified user from among at least one pre-stored food entry/exit history; and
   providing information about preferred food related to the classified user registered as the service providing target based on the retrieved entry/exit history of the food.

2. The method of claim 1, further comprising:
   inputting the face image to a previously learned face classification model to classify the user;
   updating the number of times the user is classified in response to the face image; and
   registering the classified user as the service providing target in response to the updated number of times exceeding the predetermined threshold value.

3. The method of claim 2, wherein the face classification model is learned using a predetermined number of images among a plurality of pre-stored images of faces.

4. The method of claim 1, wherein the at least one pre-stored food entry/exit history is separately generated for each of the at least one registered user.

5. The method of claim 4, further comprising updating the at least one pre-stored food entry/exit history by:
   obtaining a reference image showing a difference between an internal image obtained prior to closing of the door and an internal image obtained after closing of the door in response to closing of the door;

inputting the reference image to the previously learned food classification model to classify at least one food put into or taken out of a food storage apparatus before the door is closed; and adding information related to entry or exit of the at least one classified food to the at least one pre-stored food entry/exit history.

6. The method of claim 5, further comprising learning the food classification model by:

selecting a predetermined number of images from among a plurality of previously stored food images;

extracting feature information of food included in the selected number of images and internal feature information; and inputting the extracted feature information of the food and the internal feature information to the food classification model to learn the food classification model.

7. The method of claim 1, wherein the providing the information about the preferred food comprises:

outputting an internal position of the preferred food, stock of the preferred food, or entry/exit history of the preferred food.

8. The method of claim 1, wherein the providing the information about the preferred food comprises:

providing ingestion nutrition information of the classified user based on the entry/exit history of food associated with the classified user.

9. The method of claim 1, wherein the providing the information about the preferred food comprises:

recognizing that a person who took out the preferred food is not the classified user; and notifying an external device registered with an account of the classified user that the preferred food is taken out of a food storage apparatus by another user.

10. An apparatus configured to provide user-customized food information, the apparatus comprising:

an input interface configured to receive an input of a user;
a camera configured to capture a face image of the user;
a processor configured to:

classify the user a registered user or a new user in response to the input or the captured face image;

determine whether to register the classified user as a service providing target based on a number of times the user is classified such that the classified user is registered as the service providing target when the number of times exceeds a predetermined threshold value; and retrieve entry/exit history of food associated with the classified user from among at least one pre-stored food entry/exit history; and an output interface configured to output information about preferred food related to the classified user registered as the service providing target based on the retrieved entry/exit history of the food.

11. The apparatus of claim 10, wherein the processor is further configured to:

input the face image to a previously learned face classification model to classify the face of the user;

update the number of times the user is classified in response to the face image; and register the classified user as the service providing target in response to the updated number of times exceeding the predetermined threshold value.

12. The apparatus of claim 11, wherein the face classification model is learned using a predetermined number of images among a plurality of previously stored images of faces.

13. The apparatus of claim 10, wherein the at least one pre-stored food entry/exit history is separately generated for each of the at least one registered user.

14. The apparatus of claim 13, wherein the processor is further configured to update the at least one previously stored food entry/exit history by:

obtaining a reference image showing a difference between an internal image obtained, via the camera, prior to closing of the door and an internal image obtained, via the camera, after closing of the door;

inputting the reference image to the previously learned food classification model to classify at least one food put into or taken out of the apparatus before the door is closed; and adding information related to entry or exit of the at least one classified food to the at least one pre-stored food entry/exit history.

15. The apparatus of claim 14, wherein the processor is further configured to learn the food classification model by:

selecting a predetermined number of images from among a plurality of previously stored food images;

extracting feature information of food included in the selected number of images and internal feature information; and inputting the extracted feature information of the food and the internal feature information to the food classification model to learn the food classification model.

16. The apparatus of claim 10, further comprising:

a communication interface configured to connect to a fifth generation (5G) wireless communication system providing a 5G service and connected to an external device registered with an account of the classified user via the 5G wireless communication system, wherein the processor is further configured to:

recognize that a person who took out the preferred food from the apparatus is not the classified user; and notify, via the communication interface, the external device that the preferred food is taken out by another user.

17. The apparatus of claim 16, wherein:

the 5G service includes a massive machine-type communication (mMTC) service; and the processor is further configured to notify, via the communication interface, the external device that the preferred food is taken out of the apparatus by the other user via at least one of an MTC physical uplink shared channel (MPUSCH) or an MTC physical uplink control channel (MPUCCH) which are physical resources provided through the mMTC service.

18. The apparatus of claim 17, wherein:

the 5G wireless communication system includes a narrowband-Internet of things (NB-IoT) system providing a system bandwidth related to some resource blocks of the 5G wireless communication system and providing the mMTC service; and the processor is further configured to perform, via the communication interface, an initial access procedure to the 5G wireless communication system via an anchor type carrier related to the NB-IoT system and inform the external device that the preferred food is taken out of the apparatus by the other user via a non-anchor type carrier related to the NB-IoT system.

* * * * *